United States Patent
Tamilarasan et al.

(10) Patent No.: US 12,493,574 B2
(45) Date of Patent: Dec. 9, 2025

(54) TECHNIQUES FOR CPU CORE MANAGEMENT BASED ON OPERATION TYPES

(71) Applicant: Dell Products L.P., Hopkinton, MA (US)

(72) Inventors: Ashok Tamilarasan, Shrewsbury, MA (US); Vamsi K. Vankamamidi, Hopkinton, MA (US); Maher Kachmar, Dearborn, MI (US)

(73) Assignee: Dell Products L.P., Hopkinton, MA (US)

( * ) Notice: Subject to any disclaimer, the term of this patent is extended or adjusted under 35 U.S.C. 154(b) by 120 days.

(21) Appl. No.: 18/476,581

(22) Filed: Sep. 28, 2023

(65) Prior Publication Data

US 2025/0110910 A1 Apr. 3, 2025

(51) Int. Cl.
*G06F 13/40* (2006.01)
*G06F 13/20* (2006.01)

(52) U.S. Cl.
CPC .......... *G06F 13/4068* (2013.01); *G06F 13/20* (2013.01)

(58) Field of Classification Search
CPC .............................. G06F 13/4068; G06F 13/20
USPC .................. 710/5, 6, 18, 29, 31, 33, 52, 104
See application file for complete search history.

(56) References Cited

U.S. PATENT DOCUMENTS

| | | | | |
|---|---|---|---|---|
| 8,782,665 | B1* | 7/2014 | Sandstrom | G06F 9/544 370/336 |
| 10,235,203 | B1* | 3/2019 | Cummins | G06F 12/0871 |
| 11,630,750 | B1* | 4/2023 | Chang | G06F 11/3409 702/186 |
| 12,229,658 | B2* | 2/2025 | Sinha | G06N 3/084 |
| 2009/0319705 | A1* | 12/2009 | Foong | G06F 15/16 710/100 |
| 2013/0339635 | A1* | 12/2013 | Amit | G06F 3/0631 711/E12.001 |
| 2016/0026436 | A1* | 1/2016 | Shen | G06F 9/3867 712/43 |
| 2018/0113738 | A1* | 4/2018 | Nichols | G06F 9/5027 |
| 2019/0205177 | A1* | 7/2019 | Le Rhun | G06F 9/52 |
| 2019/0332276 | A1* | 10/2019 | Gupta | G06F 3/0655 |
| 2021/0149718 | A1* | 5/2021 | Doddaiah | G06F 9/5016 |
| 2022/0035663 | A1 | 2/2022 | Gillono et al. | |

\* cited by examiner

*Primary Examiner* — Idriss N Alrobaye
*Assistant Examiner* — Henry W Yu
(74) *Attorney, Agent, or Firm* — BainwoodHuang

(57) ABSTRACT

In at least one embodiment, processing can include: partitioning a first set of CPU cores into a plurality of CPU core subsets each associated with a single corresponding one of a plurality of predefined I/O types; classifying each of a plurality of I/O requests as one of the plurality of predefined I/O types; for each of the plurality of I/O requests, selecting a CPU core from a first CPU core subset of the plurality of CPU core subsets based, at least in part, on the first CPU core subset having a corresponding one of the plurality of predefined I/O types that matches an associated one of the plurality of predefined I/O types of said each I/O request; and processing the plurality of I/O requests on their selected CPU cores.

19 Claims, 8 Drawing Sheets

TECHNIQUES FOR CPU CORE MANAGEMENT BASED ON OPERATION TYPES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: partitioning a first set of CPU cores into a plurality of CPU core subsets each associated with a single corresponding one of a plurality of predefined I/O types; classifying each of a plurality of I/O requests as one of the plurality of predefined I/O types; for each of the plurality of I/O requests, selecting a CPU core from a first CPU core subset of the plurality of CPU core subsets based, at least in part, on the first CPU core subset having a corresponding one of the plurality of predefined I/O types that matches an associated one of the plurality of predefined I/O types of said each I/O request; and processing the plurality of I/O requests on their selected CPU cores.

In at least one embodiment, each core of the first set can be included in a single one of the plurality of CPU core subsets. The plurality of I/O requests can be received at a data storage system from one or more hosts. The plurality of predefined I/O types can include a read request type and a write request type. Classifying each of the plurality of I/O requests can include classifying read I/O operations of the plurality of I/O requests as the read request type and classifying write I/O operations of the plurality of I/O requests as the write request type. Classifying each of the plurality of I/O requests can include classifying storage reclamation commands of the plurality of I/O requests as the write request type. The storage reclamation commands classified as the write request type can include any of an unmap command and a deallocate command. Classifying each of the plurality of I/O requests can include classifying offload copy operations and offload write operations of the plurality of I/O requests as the write request type.

In at least one embodiment, the first set of CPU cores can be included in a storage system. The plurality of CPU core subsets can include a read CPU core subset that only services I/O requests classified as a read request type and can include a write CPU core subset that only services I/O requests classified as a write request type. The read CPU core subset can have M1 cores and the write CPU core subset can have M2 cores. Partitioning the first set of CPU cores can include partitioning the first set of CPU cores into the read CPU core subset and the write CPU core subset based, at least in part, on a total number of outstanding I/O requests of the read request type in the storage system and a total number of outstanding I/O requests of the write request type in the storage system. M1 can correspond to a percentage of the total number of outstanding I/O requests of the read type in the storage system, and M2 can correspond to a percentage of the total number of outstanding I/O requests of the write type in the storage system. The read CPU core subset can have M1 cores and the write CPU core subset can have M2 cores, and partitioning the first set of CPU cores can include partitioning the first set of CPU cores into the read CPU core subset and the write CPU core subset based, at least in part, on an average queue depth of cores included in the read CPU core subset and an average queue depth of cores included in the write CPU core subset. A first sum can be determined by adding the average queue depth of cores included in the read CPU core subset to the average queue depth of cores included in the write CPU core subset. M1 can correspond to a percentage or ratio of the average queue depth of cores included in the read CPU core subset with respect to the first sum, and wherein M2 can correspond to a percentage or ratio of the average queue depth of cores included in the write CPU core subset with respect to the first sum.

In at least one embodiment, processing can include: determining that a first I/O request of the plurality of I/O requests is a read request type; and selecting one core from the read CPU core subset for the first I/O request of the read request type, wherein said one core has a current core queue depth that is less than a specified threshold. The specified threshold can be a maximum allowable queue depth for a core of the read CPU core subset based, at least in part, on Nr and an average queue depth of cores in the read CPU core subset, and wherein Nr can be based, as least in part, on a number of cores in the read CPU core subset and an average amount of time to complete an I/O request of the read request type.

In at least one embodiment, processing can include: determining that a first I/O request of the plurality of I/O requests is a write request type; and selecting one core from the write CPU core subset for the first I/O request of the write request type, wherein said one core has a current core queue depth that is less than a specified threshold. The specified threshold can be a maximum allowable queue depth for a core of the write CPU core subset based, at least in part, on Nw and an average queue depth of cores in the write CPU core subset, and wherein Nw can be based, as least in part, on a number of cores in the write CPU core subset and an average amount of time to complete an I/O request of the write request type.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
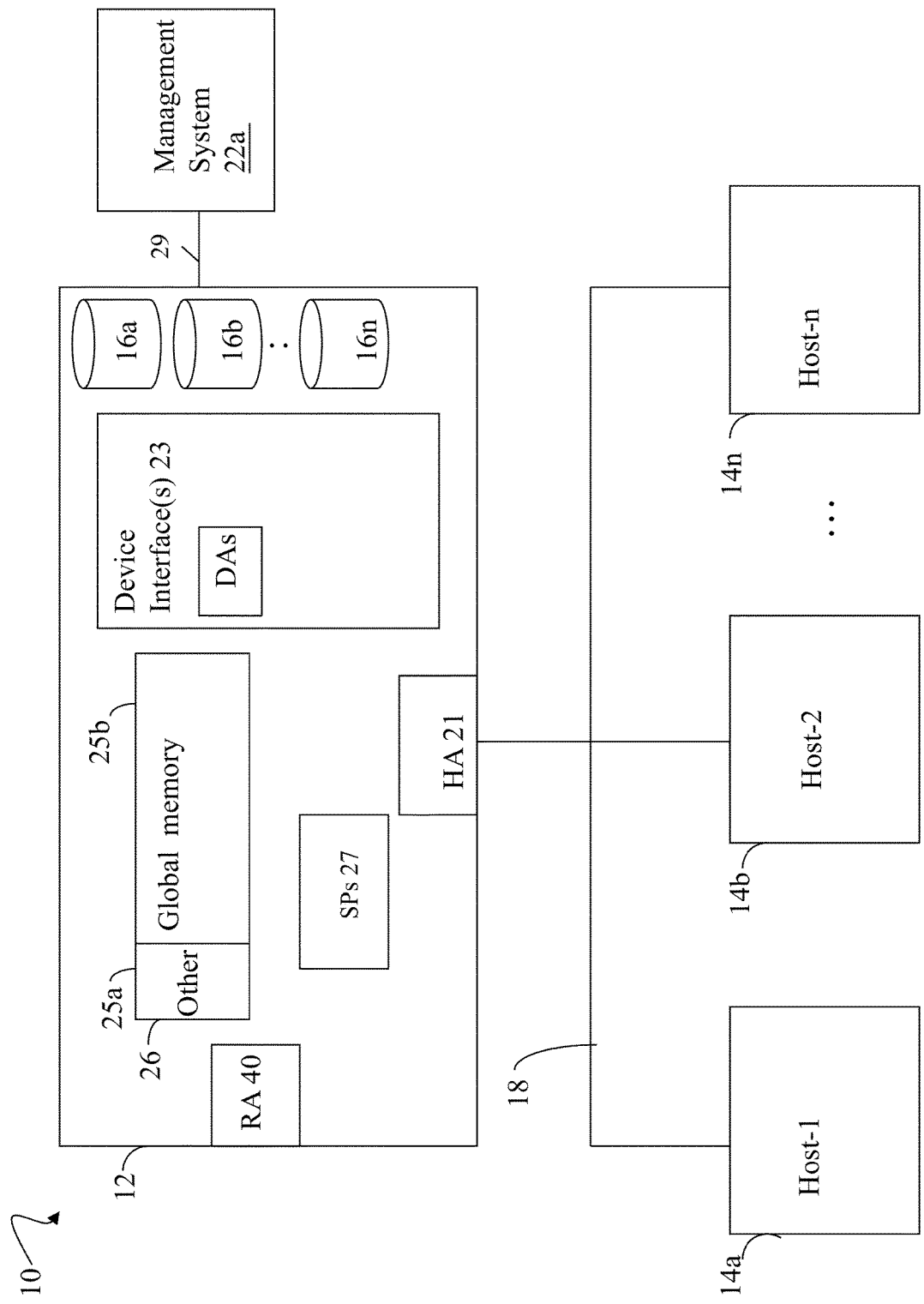
FIG. 1 is an example of components that can be included in a system in accordance with the techniques of the present disclosure.

A system, such as a data storage system, can include one or more multicore CPUs. The CPU cores or processing cores can generally perform processing to service multiple types or multiple classifications of commands, requests or operations at the same time. The multiple types or classifications can include, for example, reads, writes and background storage operations or tasks. Each core can execute its own code stream independent of other processing cores. Thus, the manner in which requests, commands or operations are distributed among the CPU cores or processing cores can have a significant impact on system performance.

CPU core performance can be increased when various CPU optimizations, such as branch prediction and prefetching, are accurate. For example, a core can execute code efficiently with optimized performance if the code that needs to be executed can be correctly predicted and prefetched by the CPU such as a result of effective code branch predictions. Otherwise, if the correct code to be executed is not prefetched, the core's code execution can stall waiting for the next instruction to be fetched and thereby wasting core execution cycles that could have otherwise been used to execute code.

In some systems, a coder or developer can provide hints to a compiler or CPU regarding a likely or expected execution flow outcome associated with a runtime conditional statement evaluation such as an if-then-else condition. For example, an if-then-else conditional construct can be included in code where a first condition associated with the 'then' clause is further associated with a non-error state, and a second condition associated with the 'else' clause is further associated with an error state. A coder or developer can provide a hint, such as using a compiler, indicating that the first condition of the 'then' clause is expected to evaluate to true rather than second condition of the 'else' clause. As a result, instruction prefetching can be performed based on the foregoing hint provided so that a next instruction of a first code path associated with the 'then' clause is prefetched rather than a next instruction of a second different code path associated with the 'else' clause.

When different types or classifications of operations are interleaved for execution on a same particular core, effectively causing the processor to bring in a variety of different corresponding code segments for the different types or classifications, code prefetching and/or branch prediction can be inaccurate and inefficient causing stalls resulting in degraded performance. For example, the code streams executed for processing read operations and write operations can differ such that if the same core services both reads and writes intermixed or interleaved, the core processing can stall, for example, such as due to incorrect branch prediction and/or failure to prefetch instructions of a correct code path as noted above when switching code paths from servicing a read to servicing a write, and vice versa.

In a similar manner, different data structures can be utilized when executing different code segments associated with different corresponding request or operation types such as reads and writes. In at least one data storage system, different sets of numerous and/or complex data structures can be utilized with the different read and write code paths. When the different code streams for reads and writes are interleaved for execution on the same core, further inefficiencies can result due to the fact that a particular set of data structures needs to be loaded into cache for use by each of the read code path and write code path. As such, when a core switches execution between the read code stream and the write code stream, a performance inefficiency can result due to a need to access and load into cache a set of corresponding data structures that varies with the type of read or write.

The present disclosure describes techniques that overcome the foregoing drawbacks and provide for improved performance by identifying a type or classification of each received command, request or operation, such as I/O requests, and then assigning such received commands, requests or operations for servicing by particular cores.

In at least one embodiment, the techniques of the present disclosure provide for improved storage system performance by identifying read requests and write requests, and then assigning requests to run on a specific set of cores based, at least in part, on the request type or classification of read or write.

In at least one embodiment, the techniques of the present disclosure provide for segregating different types or classifications of I/O flows or streams, such as for reads and writes, to execute on different CPU cores. For example in at least one embodiment, a first portion of a system's CPU cores can be designated to service only read requests and a second portion of a system's CPU cores can be designated to service only write requests, where cores of the first portion and the second portion can be mutually exclusive. In at least one embodiment, the number of cores in the first and second portions can vary during operation of the system, and can be dynamically determined in accordance with one or more criteria or conditions.

In at least one embodiment, background storage operations and I/O operations can be segregated to run on separate sets of cores, where non-critical, longer running background storage operations can be run on a first set of cores and latency-critical, higher priority I/O requests, or more generally read and write operations, can be run on a separate second set of cores. In at least one embodiment, the second set of cores (sometimes referred to as I/O cores or I/O request cores) can be further segregated or partitioned for servicing reads and writes such that read-related code paths or flows are run on the first portion of the cores and write-related code paths or flows are run on the second portion of the cores.

In at least one embodiment, the techniques of the present disclosure provide for further segregating the I/O requests based on I/O type or classification of read or write, where the reads can be serviced by the first portion of the second set of cores, and where writes can be serviced by the second portion of the second set of cores.

In at least one embodiment, given the second set of cores for running I/O requests, techniques of the present disclosure provide for dynamically adjusting the count or number of cores in the first and second portions of I/O cores segregated, respectively, for running reads and writes. In at least one embodiment, the one or more criteria or conditions used to determine the number of cores in the first and second portions of I/O cores can be based, at least in part, on the total number of pending or outstanding reads and the total number of pending or outstanding writes in the system. In at least one embodiment prior to collecting sufficient data regarding core queue depths, the foregoing total numbers of pending reads and writes can be used to determine a percentage of outstanding reads and a percentage of outstanding writes, where the number of cores in the first and second portions can be based on such percentages. The queue depth for a core can denote a number of requests that are assigned to the core for servicing by the particular core.

In some embodiments, a core designated for servicing only read requests can sometimes be referred to herein as a read core or R core. In some embodiments, a core designated for servicing only write requests can sometimes be referred to herein as a write core or W core. In some embodiments, cores servicing I/O requests can be initially classified as mixed servicing both reads and writes. During a startup or initial time period, each mixed core can be subsequently classified as an R core or a W core. In some embodiments, once mixed cores are classified as R cores and W cores, the total number of cores servicing I/O requests can be periodically repartitioned into the first portion of R cores and the second portion of W cores, where the number of cores in the first and second portions can be determined in accordance with one or more criteria. In at least one embodiment, the one or more criteria or conditions used to determine the number of cores in the first and second portions can be based, at least in part, on the average queue depth of R cores and the average queue depth of W cores.

In at least one embodiment, in order to load balance among the I/O cores, such as the second set of cores, servicing read and write requests, a specified maximum allowable per core queue depth can be specified.

In at least one embodiment, the maximum allowable per core queue depth can be based, at least in part, on an average queue depth per core with respect to read and write requests assigned to the second set of cores. In at least one embodiment, the maximum allowable per core queue depth for R cores can be based, at least in part, on the average queue depth of R cores, and a value Nr for R cores servicing reads. In at least one embodiment, the maximum allowable per core queue depth for W cores can be based, at least in part, on the average queue depth of W cores, and a value Nw for W cores servicing writes.

Thus, in at least one embodiment for a core C1 servicing reads but not writes, C1's maximum allowable queue depth can be expressed as Nr* the average queue depth of R cores or, more generally, cores that can service only reads; and for a core C2 servicing writes but not reads, C2's maximum allowable queue depth can be expressed as Nw* the average queue depth of W cores or, more generally, cores that can service only writes. In at least one embodiment Nr and Nw can both be integer values greater than zero. In at least one embodiment, the value for Nr can be dynamically determined and adjusted based, at least in part, on the number of R cores servicing only reads and the average amount of time taken to complete a read request during a specified time period. In at least one embodiment, the value for Nw can be dynamically determined and adjusted based, at least in part, on the number of W cores servicing only writes and the average amount of time taken to complete a write request during a specified time period.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
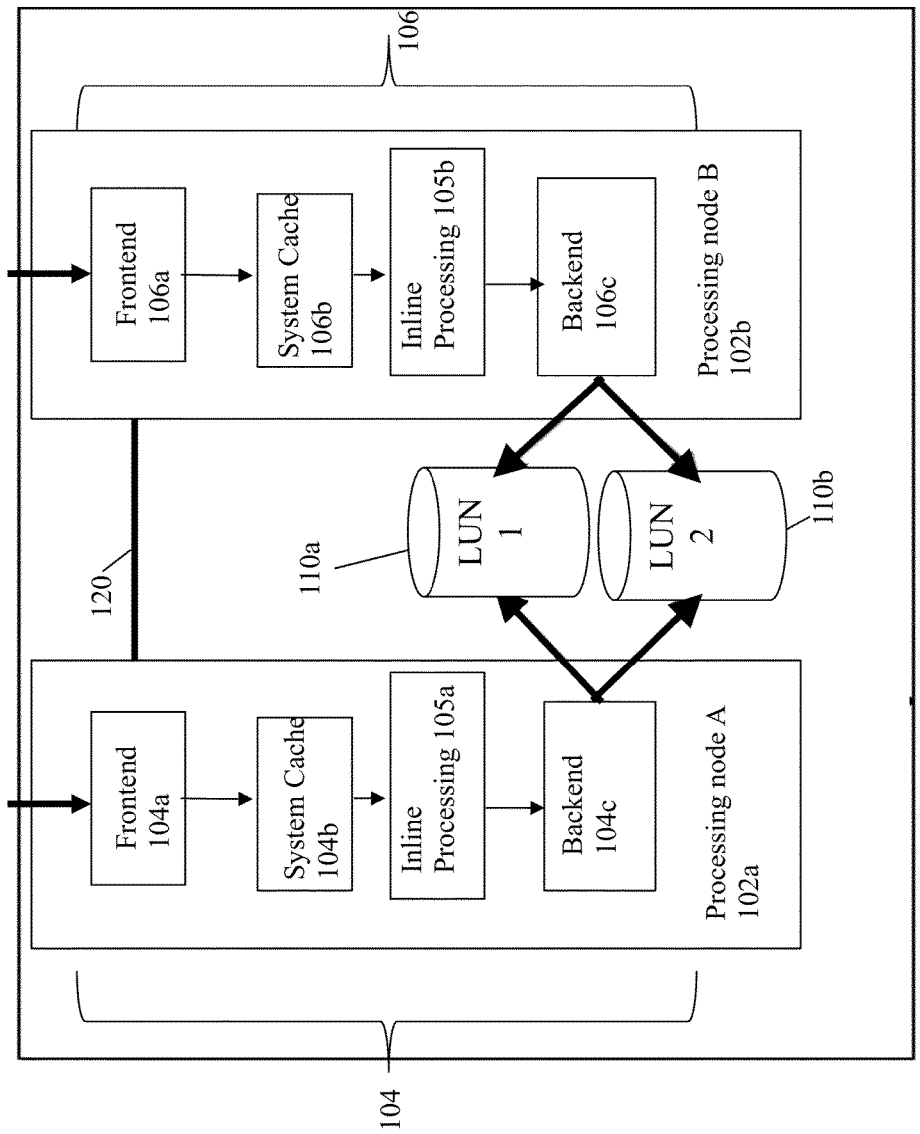
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

A system, such as a data storage system, can include one or more multicore CPUs. The CPU cores or processing cores can generally perform processing to service multiple types or multiple classifications of commands, requests or operations at the same time. The multiple types or classifications can include, for example, reads, writes and background storage operations or tasks. Each core can execute its own code stream independent of other processing cores. Thus, the manner in which requests, commands or operations are distributed among the CPU cores or processing cores can have a significant impact on system performance.

CPU core performance can be increased when various CPU optimizations, such as branch prediction and prefetching, are accurate. For example, a core can execute code efficiently with optimized performance if the code that needs to be executed can be correctly predicted and prefetched by the CPU such as a result of effective code branch predictions. Otherwise, if the correct code to be executed is not prefetched, the core's code execution can stall waiting for the next instruction to be fetched and thereby wasting core execution cycles that could have otherwise been used to execute code.

In some systems, a coder or developer can provide hints to a compiler or CPU regarding a likely or expected execution flow outcome associated with a runtime conditional statement evaluation such as an if-then-else condition. For example, an if-then-else conditional construct can be included in code where a first condition associated with the 'then' clause is further associated with a non-error state, and a second condition associated with the 'else' clause is further associated with an error state. A coder or developer can provide a hint, such as using a compiler, indicating that the first condition of the 'then' clause is expected to evaluate to true rather than second condition of the 'else' clause. As a result, instruction prefetching can be performed based on the foregoing hint provided so that a next instruction of a first code path associated with the 'then' clause is prefetched rather than a next instruction of a second different code path associated with the 'else' clause.

When different types or classifications of operations are interleaved for execution on a same particular core, effectively causing the processor to bring in a variety of different corresponding code segments for the different types or classifications, code prefetching and/or branch prediction can be inaccurate and inefficient causing stalls resulting in degraded performance. For example, the code streams executed for processing read operations and write operations can differ such that if the same core services both reads and writes intermixed or interleaved, the core processing can stall, for example, such as due to incorrect branch prediction and/or failure to prefetch instructions of a correct code path as noted above when switching code paths from servicing a read to servicing a write, and vice versa.

In a similar manner, different data structures can be utilized when executing different code segments associated with different corresponding request or operation types such as reads and writes. In at least one data storage system, different sets of numerous and/or complex data structures can be utilized with the different read and write code paths. When the different code streams for reads and writes are interleaved for execution on the same core, further inefficiencies can result due to the fact that a particular set of data structures needs to be loaded into cache for use by each of the read code path and write code path. As such, when a core switches execution between the read code stream and the write code stream, a performance inefficiency can result due to a need to access and load into cache a set of corresponding data structures that varies with the type of read or write.

The present disclosure describes techniques that overcome the foregoing drawbacks and provide for improved performance by identifying a type or classification of each received command, request or operation, such as I/O requests, and then assigning such received commands, requests or operations for servicing by particular cores.

In at least one embodiment, the techniques of the present disclosure provide for improved storage system performance by identifying read requests and write requests, and then assigning requests to run on a specific set of cores based, at least in part, on the request type or classification of read or write.

In at least one embodiment, the techniques of the present disclosure provide for segregating different types or classifications of I/O flows or streams, such as for reads and writes, to execute on different CPU cores. For example in at least one embodiment, a first portion of a system's CPU cores can be designated to service only read requests and a second portion of a system's CPU cores can be designated to service only write requests, where cores of the first portion and the second portion can be mutually exclusive. In at least one embodiment, the number of cores in the first and second portions can vary during operation of the system, and can be dynamically determined in accordance with one or more criteria or conditions.

In at least one embodiment, background storage operations and I/O operations can be segregated to run on separate sets of cores, where non-critical, longer running background storage operations can be run on a first set of cores and latency-critical, higher priority I/O requests, or more generally read and write operations, can be run on a separate second set of cores. In at least one embodiment, the second set of cores (sometimes referred to as I/O cores or I/O request cores) can be further segregated or partitioned for servicing reads and writes such that read-related code paths or flows are run on the first portion of the cores and write-related code paths or flows are run on the second portion of the cores.

In at least one embodiment, the techniques of the present disclosure provide for further segregating the I/O requests based on I/O type or classification of read or write, where the reads can be serviced by the first portion of the second set of cores, and where writes can be serviced by the second portion of the second set of cores.

In at least one embodiment, given the second set of cores for running I/O requests, techniques of the present disclosure provide for dynamically adjusting the count or number of cores in the first and second portions of I/O cores segregated, respectively, for running reads and writes. In at least one embodiment, the one or more criteria or conditions used to determine the number of cores in the first and second portions of I/O cores can be based, at least in part, on the total number of pending or outstanding reads and the total number of pending or outstanding writes in the system. In at least one embodiment prior to collecting sufficient data regarding core queue depths, the foregoing total numbers of pending reads and writes can be used to determine a percentage of outstanding reads and a percentage of outstanding writes, where the number of cores in the first and second portions can be based on such percentages. The queue depth for a core can denote a number of requests that are assigned to the core for servicing by the particular core.

In some embodiments, a core designated for servicing only read requests can sometimes be referred to herein as a read core or R core. In some embodiments, a core designated for servicing only write requests can sometimes be referred to herein as a write core or W core. In some embodiments, cores servicing I/O requests can be initially classified as mixed servicing both reads and writes. During a startup or initial time period, each mixed core can be subsequently classified as an R core or a W core. In some embodiments, once mixed cores are classified as R cores and W cores, the total number of cores servicing I/O requests can be periodically repartitioned into the first portion of R cores and the second portion of W cores, where the number of cores in the first and second portions can be determined in accordance with one or more criteria. In at least one embodiment, the one or more criteria or conditions used to determine the number of cores in the first and second portions can be based, at least in part, on the average queue depth of R cores and the average queue depth of W cores.

In at least one embodiment, in order to load balance among the I/O cores, such as the second set of cores, servicing read and write requests, a specified maximum allowable per core queue depth can be specified.

In at least one embodiment, the maximum allowable per core queue depth can be based, at least in part, on an average queue depth per core with respect to read and write requests assigned to the second set of cores. In at least one embodiment, the maximum allowable per core queue depth for R cores can be based, at least in part, on the average queue depth of R cores, and a value Nr for R cores servicing reads.

In at least one embodiment, the maximum allowable per core queue depth for W cores can be based, at least in part, on the average queue depth of W cores, and a value Nw for W cores servicing writes.

Thus, in at least one embodiment for a core C1 servicing reads but not writes, C1's maximum allowable queue depth can be expressed as Nr* the average queue depth of R cores or, more generally, cores that can service only reads; and for a core C2 servicing writes but not reads, C2's maximum allowable queue depth can be expressed as Nw* the average queue depth of W cores or, more generally, cores that can service only writes. In at least one embodiment Nr and Nw can both be integer values greater than zero. In at least one embodiment, the value for Nr can be dynamically determined and adjusted based, at least in part, on the number of R cores servicing only reads and the average amount of time taken to complete a read request during a specified time period. In at least one embodiment, the value for Nw can be dynamically determined and adjusted based, at least in part, on the number of W cores servicing only writes and the average amount of time taken to complete a write request during a specified time period.

The foregoing and other aspects of the techniques of the present disclosure are described in more detail in the following paragraphs.

In at least one embodiment, commands, requests and operations that access content or data stored on the storage system can be generally classified as reads having a read I/O type or attribute, and writes having a write I/O type or attribute. In at least one embodiment, read requests, commands or operations can include read I/O operations such as SCSI read I/O operations as well as one or more other specified operations, that can vary with embodiment, that can generally access or read content from the storage system. In at least one embodiment, a read request, command or operation can generally include commands or requests that read data or content from a target location of a storage object where servicing such commands or requests can all use at least a portion of the same common code and/or data.

In at least one embodiment, write requests, commands or operations can include write I/O operations such as SCSI write I/O operations as well as one or more other specified operations, that can vary with embodiment, that can generally write or modify content stored on the storage system. In at least one embodiment, write requests, commands or operations can also include one or more specified operations, such as storage reclamation commands, that modify associated or mapped storage regions of storage objects thereby effectively modifying content as can be associated with deleting entire storage objects or regions of storage associated with a storage object. For example, in at least one embodiment, writes can also include any one or more of the following: offload copy or write operations, and storage reclamation commands. In at least one embodiment, storage reclamation commands can include, for example, SCSI UNMAP commands as well as other similar storage reclamation commands of other supported protocols such as NVMe (Non-volatile Memory Express. For example, in at least one embodiment storage reclamation commands can include the NVMe DEALLOCATE command which is analogous to the SCSI UNMAP command in that the DEALLOCATE command deallocates a storage region and performs storage reclamation making the storage region available for reuse.

In at least one embodiment, the UNMAP command can be issued to the storage system by a host application or operating system. The UNMAP commands can specify that a particular range of storage, such as for a particular LUN or logical device and associated LBA range, is no longer in use by the host application or operating system and can be reclaimed. As a result, the specified storage range or region of the UNMAP command can be reclaimed by the storage system and thus increases the free or available storage capacity of the storage system. The UNMAP command can be issued, for example, by a host operating system when the host or application deletes one or more files from a file system, and/or deletes one or more tables from a database so as to effectively modify or delete content of such deleted files and/or tables. Files can be mapped to underlying storage regions of block storage on one or more LUNs. Thus, the deleted files can be mapped to a storage region that can now be unmapped and deallocated or reclaimed. More generally, the UNMAP command can be used to specify a storage region that is no longer in use, whereby the storage region can be reclaimed for reuse and added to the free or available storage capacity in the storage system.

In at least one embodiment, offload copy or write commands perform copy or write operations internal within the data storage system or appliance to copy data from a source to a target location, where the source (including the write data) and target (denoting the target location where the write data is copied to) can both be in the system or appliance. In at least one embodiment, the WRITE SAME command can be used to fill or write to a range of blocks on disk with a pattern or block of data specified by the command. For example, WRITE SAME can be used to write zeroes or some other specified content to a range of blocks. In at least one embodiment, the XCOPY command can request that the storage system copy data from a source location to a target location, where the source and target locations can be logical addresses such as, for example, on block storage devices within the data storage system. With the XCOPY command, there is no write data transmitted between the host and storage system but rather the host can use the XCOPY command to instruct the storage system to internally copy data from the source location to the target location.

Thus, although reads and writes can respectively include read I/O and write I/Os, more generally, the techniques of the present disclosure can be extended to one or more operations classified as read requests, commands or operations having an associated read I/O type; and can be more generally extended to one or more operations classified as write requests, commands or operations having an associated write I/O type. In at least one embodiment, write commands, requests or operations can include any one or more of: write I/O operations, WRITE SAME commands, UNMAP commands, DEALLOCATE commands, storage reclamation commands, XCOPY commands, offload copy commands, and offload write commands. In at least one embodiment, a read request, command or operation can generally include commands or requests that read data or content from a target location of a storage object where servicing such commands or requests can all use at least a portion of the same common code and/or data. Generally, such other commands or operations that write content to a target location can be treated as a write operation and included in the same general I/O type of write. In at least one embodiment, commands or operations generally treated as write operations and included in the same general I/O type of write can all use at least a portion of the same code and/or data.

In at least one embodiment, the total number of outstanding I/O requests in the system can denote a count of the total number of I/O requests of the multiple predefined types, such as reads and writes, that have been received by the storage system such as from one or more hosts or other storage client but not yet acknowledged to the issuing host or other storage client.

In at least one embodiment, the total number of outstanding I/O requests can include a total number of outstanding write requests and a total number of outstanding read requests. The total number of outstanding write requests can thus denote a count of the total number of writes received by the storage system from storage clients but not yet acknowledged to the issuing storage clients. The total number of outstanding read requests can thus denote a count of the total number of reads received by the storage system from storage clients but not yet acknowledged to the issuing storage clients.

In at least one embodiment, a core queue depth with respect to a single CPU core can be a count of the number of requests assigned to the core for processing or a count of the number of outstanding requests assigned to the core for processing.

Figure 3:
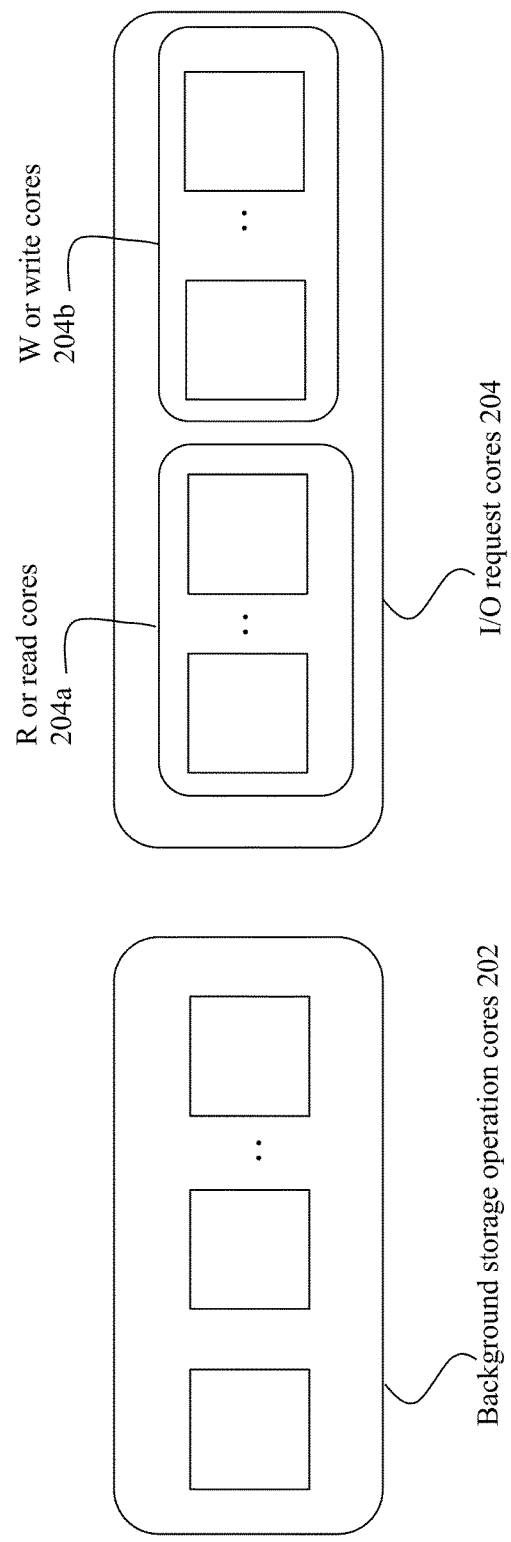
FIG. 3 is an example illustrating sets of CPU cores in at least one embodiment in accordance with the techniques of the present disclosure.

Referring to FIG. 3, shown is an example 200 illustrating segregation of processing cores in at least one embodiment in accordance with the techniques of the present disclosure.

In at least one embodiment, a data storage system can include M cores. M can generally be any positive integer denoting a suitable number of cores in the system allocated for use with the techniques of the present disclosure. M can vary with embodiment.

In at least one embodiment, the M cores can be dynamically partitioned into a first set of background storage operation cores 202 that can service only background storage operations, tasks, requests or commands, and a second set of I/O request cores 204, that can service only I/O requests such as read and write requests. In at least one embodiment, generally, any suitable technique or metric(s) can be used to partition the M cores of the system into sets 202 and 204.

Background storage operations, tasks requests or commands can generally include one or more types of storage system operations that perform storage management tasks such as for managing the organization of storage. For example in at least one embodiment, background storage operations can include flush operations and rebuild operations. Flush operations can persist data or content, such as stored in a cache or memory, to long-term non-volatile BE storage of the system. Rebuild operations can involve rebuilding data from a failed storage drive or PD onto a replacement storage drive or PD such as in connection with a RAID group rebuild operation. In some embodiments, the background storage operations can be further classified and partitioned, for example, long-running background storage operations and shorter running standard background storage operations. In such an embodiment, a background storage operation can be characterized as long running or standard shorter running depending, at least in part, on the expected amount of time needed to complete the particular background operation. In some embodiments, additional techniques can optionally be performed to further selectively run different types of background storage operations on subsets or particular ones of the background storage operation cores 202.

In at least one embodiment, the M cores can be periodically dynamically partitioned or repartitioned based, at least in part, on the total number of background storage operations, tasks, requests, or commands in the system and the total number of I/O requests, commands or operations in the system. Generally in at least one embodiment, the I/O requests can include client storage read and write requests such as received from hosts or other data storage system clients. In at least one embodiment, the total number of background storage operations can denote a count of the number of background storage operations that are currently assigned to background request cores 202 for servicing or execution. In at least one embodiment, the total number of I/O requests can denote a count of the number of client read and write requests that are currently assigned to I/O request cores for servicing or execution. In at least one embodiment, the total number of I/O requests can also more generally include all outstanding I/O requests received at the storage system from storage clients but where such I/O requests have not yet been acknowledged to the client.

In at least one embodiment, the M cores can be periodically repartitioned into the sets 202 and 204 each having a number of cores based, at least in part, on the total number of background storage operations currently assigned to background storage operation cores 202 and a total number of I/O requests currently assigned to I/O request cores 204. For example, there can be 400 I/O requests and 100 background storage operations assigned to the M cores such that the aggregated count is 500. The total 400 I/O requests in this example can generally represent 80% of the aggregate count and the total 100 background storage operations can generally represent 20% of the aggregate count. The M cores can be repartitioned based, at least in part, on the foregoing percentages in accordance with the current workloads of the core sets 202, 204. In at least one embodiment, the M cores can be repartitioned such that 80% of the M cores are included in the I/O request core set 204 and such that 20% of the M cores are included in the background storage operation core set 202. An embodiment can also include other rules, conditions or criteria used in connection with partitioning or repartitioning the M cores such as on a periodic basis. For example, in at least one embodiment, rules can specify any of a minimum size or a maximum size for the number of cores for the sets 202, 204. As another example in at least one embodiment, rules can specify a maximum amount of change or regrouping of cores with respect to a number of cores in a set 202, 204 between any two consecutive repartitionings of the M cores in order to avoid or limit sudden extreme changes and thrashing in core resources allocated to the sets 202, 204. For example in at least one embodiment, a rule can specify that no more than a threshold number of cores can be regrouped or change groupings between 202 and 204 in at least one embodiment. Put another way, the rule can specify that the count or number of cores in each of 202 and 204 should not increase or decrease by more than a threshold amount.

In at least one embodiment in accordance with the techniques of the present disclosure, the I/O request core set 204 can be further partitioned and periodically repartitioned into a first portion of R or read cores 204a and a second portion of W or write cores 204b. In at least one embodiment, the I/O request cores 204 can be periodically dynamically repartitioned based, at least in part, on one or more metrics characterizing the current read and write request workload mix in the system and/or assigned to the I/O request cores 204. For example, as discussed in more detail elsewhere herein, in at least one embodiment, the number or count of cores of the set 204 included in each of 204a-b can be based, at least in part, on a total number of outstanding read requests in the system and a total number of outstanding write requests in the system. In at least one embodiment, the total number of outstanding read requests can include read requests assigned to cores of 204 as well as read requests that may have been received but not yet assigned to one of the cores of 204 for processing; and the total number of outstanding write requests can include write requests assigned to cores of 204 as well as write requests that may have been received but not yet assigned to one of the cores of 204 for processing. In at least one embodiment, an outstanding request, such as a read or write request, can be one that is received at the storage system from a client but has not yet been acknowledged as completed to the client.

To further illustrate, consider a case where the I/O request core set 204 includes J cores, where J is generally an integer greater than zero. The total number of outstanding I/O requests can be 500 where 300 of those are read requests and where 200 of those are write requests, thereby representing a mixed workload of 60% reads and 40% writes. The J cores of the set 204 can be repartitioned based, at least in part, on the foregoing percentages in accordance with the current read and write workload percentages. In at least one embodiment based on the foregoing exemplary percentages, the J cores can be repartitioned such that 60% of the J cores are included in the R core set 204a and such that 40% of the J cores are included in the W core set 204b. Thus current values for the total outstanding read requests and the total outstanding write requests in the system at a point in time T1 can be used to repartition the I/O request cores 204 into the sets 204a-b for use in a next subsequent point in time T1+1.

An embodiment can also include other rules, conditions or criteria used in connection with partitioning or repartitioning the J cores of the set 204 into subsets 204a-b such as on a periodic basis. For example, in at least one embodiment, rules can specify any of a minimum size or a maximum size for the number of cores for the sets 204a-b. As another example in at least one embodiment, rules can specify a maximum amount of change with respect to a number of cores in a set 204a-b between any two consecutive repartitionings of the set 204 in order to avoid or limit sudden extreme changes and thrashing in core resources allocated to the sets 204a-b. For example in at least one embodiment, a rule can specify that no more than a threshold number of cores can be regrouped or change groupings between 204a-b in at least one embodiment. Put another way, the rule can specify that the count or number of cores in each of 204a and 204b should not increase or decrease by more than a threshold amount.

In at least one embodiment, the number or count of cores of the set 204 included in each of 204a-b can be based, at least in part, on an average core queue depth of all R cores included in the set 204a and an average core queue depth of all W cores included in the set 204b. In some instances herein, the average core queue depth of R cores 204a can also be referred to as the average R core queue depth, and the average core queue depth of W cores 204b can also be referred to as the average W core queue depth.

To further illustrate, consider a case where the I/O request core set 204 includes J cores, where J is generally an integer greater than zero. The average R core queue depth can be 30 and the average W core queue depth can be 20, thereby representing a mixed workload of 60% reads and 40% writes based on the foregoing average R and W core queue depths. The J cores of the set 204 can be repartitioned based, at least in part, on the foregoing percentages in accordance with the current average R and W core queue depths. In at least one embodiment based on the foregoing exemplary percentages, the J cores can be repartitioned such that 60% of the J cores are included in the R core set 204a and such that 40% of the J cores are included in the W core set 204b. Thus current values for the average R and W core queue depths for a current time period K can be used to repartition the I/O request cores 204 into the sets 204a-b for use in the next subsequent time period K+1. An embodiment can also include other rules, conditions or criteria used in connection with partitioning or repartitioning the J cores of the set 204 such as on a periodic basis. For example, in at least one embodiment, rules can specify any of a minimum size or a maximum size for the number of cores for the sets 204a-b. As another example in at least one embodiment, rules can specify a maximum amount of change with respect to a number of cores in a set 204a-b between any two consecutive repartitionings of the set 204 in order to avoid or limit sudden extreme changes and thrashing in core resources allocated to the sets 204a-b.

Figure 4:
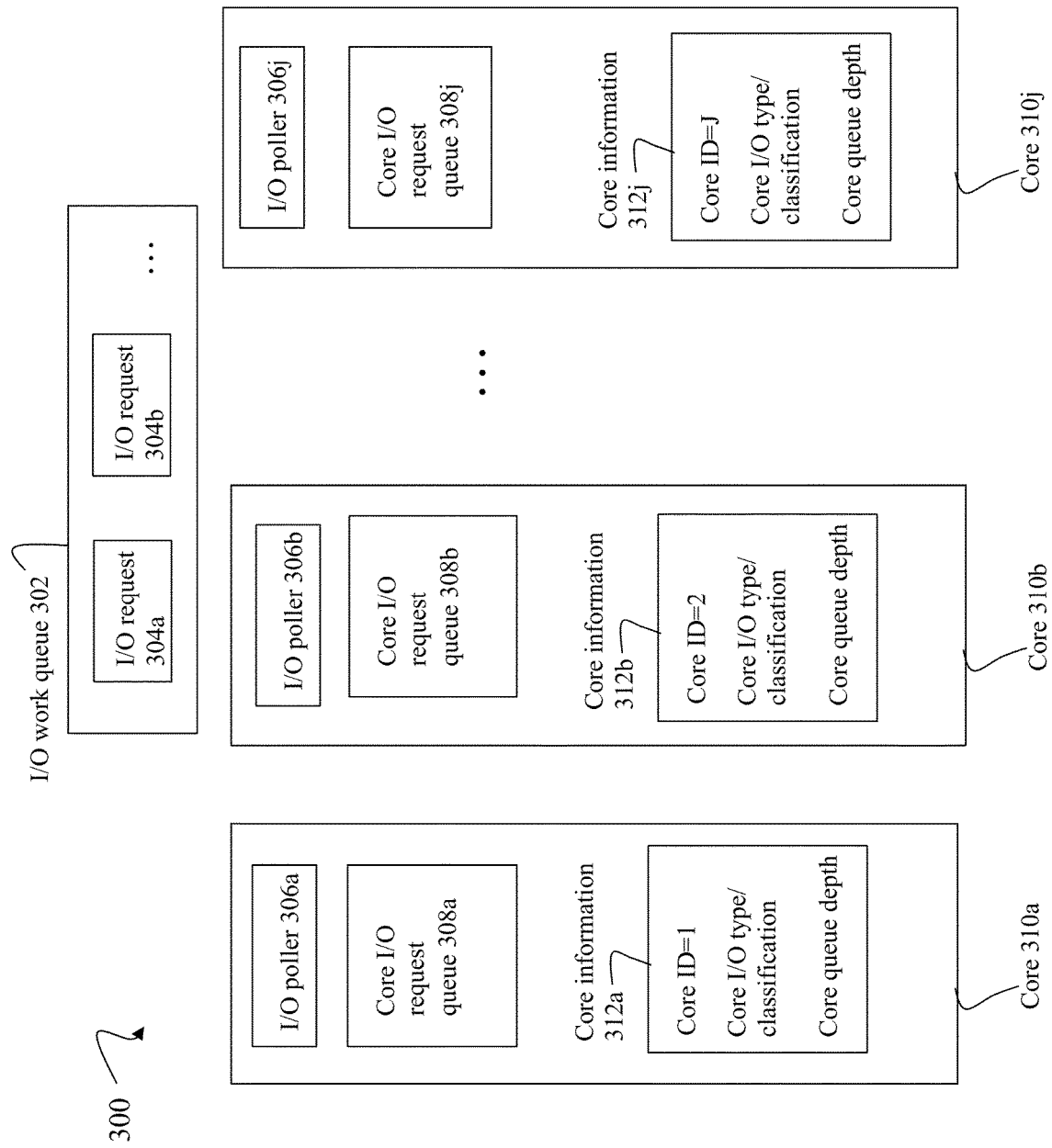
FIG. 4 is an example illustrating various components and related information used in at least one embodiment in accordance with the techniques of the present disclosure.

Referring to FIG. 4, shown is an example 300 illustrating various components that can be included in at least one embodiment in accordance with the techniques of the present disclosure.

The example 300 includes an I/O work queue 302 and cores 310a-j. The cores 310a-j denote the J cores of the I/O request core set 204 (of FIG. 3). The I/O work queue 302 includes I/O requests 304a, 304b and so on. In at least one embodiment, the I/O work queue 302 includes I/O requests that are received by the storage system from one or more hosts or other clients but where such I/O requests of 302 have not yet been assigned to a core for processing. In at least one embodiment, the I/O requests on the I/O queue 302 can collectively include I/O requests received at multiple FE (front end) ports of the data storage system from one or more hosts. In at least one embodiment, each I/O request on the queue 302 can have an associated I/O type or classification that is one of a predefined set of classifications or types including read and write.

Each of the cores 310a-310j includes a corresponding I/O poller 306a-j, core I/O request queue 308a-j and core information 312a-j. Each core 310a-j can be uniquely associated with a single one of the I/O pollers 306a-j. To further illustrate with respect to core 310a, its corresponding I/O poller 306a can pull or fetch I/O requests from the I/O work queue 302 for servicing by the core 310a. In a similar manner, I/O pollers 306b-j of the remaining cores 310b-j can similarly pull or fetch I/O requests from the I/O work queue 302 for processing by a respective one of the cores 310b-j.

Each of the cores 310a-j includes a corresponding core I/O request queue 308a-j of I/O requests currently assigned for processing on the respective one of the cores 310a-j. For example, the core I/O request queue 308a includes I/O requests currently assigned for processing by the core 310a. In a similar manner, the core I/O request queues 308b-j include I/O requests that are currently assigned to a corresponding one of the cores 310b-j.

In at least one embodiment, each of the cores 310a-j can include corresponding core information 312a-j regarding the respective one of the cores 310a-j. To illustrate with respect to core 310a, its corresponding core information 312a can include a core ID (identifier)=1 uniquely identifying core 310a, a core I/O type or classification currently assigned to core 310a, and a current core queue depth of the core 310a.

In at least one embodiment such as once the system is at a steady state, each core 310a-j can be assigned a current core I/O type or classification that is either read (R) or write (W). Cores with an associated R type can be included in the current set of R cores 204a and cores with an associated W type can be included in the current set of W cores 204b. Consistent with other discussion herein, the core I/O type or classification of a core can be assigned or reassigned periodically in accordance with the dynamic partitioning/repartitioning of the I/O request cores 204 into the mutually exclusive portions or subsets 204a-b.

The current core queue depth of a core can denote a count of the number of I/O requests currently assigned to the core for processing as included in the core's corresponding core I/O request queue. For example, if there are 10 I/O requests assigned to core 310a, the core queue depth for 310a as included in the corresponding core information 312a can be 10. The core queue depth 310a can be updated over time to reflect the current number of I/O requests in the core I/O request queue 308a corresponding to the core 310a.

In at least one embodiment, an I/O poller such as 306a associated with core 310a can pull I/O requests from the I/O work queue 302 as noted above. In at least one embodiment, the I/O poller 306a can then examine the I/O type or classification of the pulled I/O request to determine whether the I/O request can be serviced by the particular core 310a based, at least in part, on the I/O request's type or classification (e.g., read or write), the currently assigned core I/O type or classification of core 310a, and the current core queue depth of core 310a. If the pulled I/O request can be serviced by the core 306a, the I/O request is added to the I/O request queue 308a of the core 310a. Otherwise, the I/O request can be forwarded to another selected one of the cores 310b-j for servicing. In at least one embodiment, the selected one of the cores 310b-j can be based, at least in part, on the I/O request's type or classification, the currently assigned core I/O type or classification of cores 310b-j, and the current core queue depth of cores 310b-j. Pulling I/O requests from the I/O work queue 302 and associated processing can be performed in a similar manner with respect to the remaining cores 310b-j.

As a variation from that described above with respect to the I/O work queue 302, the I/O work queue 302 can alternatively include a single global R work queue and a single global W work queue. The single global R work queue can include all received read requests (e.g., I/O requests having an associated R or read type) that are not yet assigned for processing to one of the cores of the I/O request core set 204. The single global W work queue can include all received write requests (e.g., I/O requests having an associate W or write type) that are not yet assigned for processing to one of the cores of the I/O request core set 204. In at least one embodiment, processing can be performed such that I/O pollers of cores currently included in the R core set 204a (e.g., having a core I/O type=R) or more generally identified as servicing read requests can pull or obtain read requests from the single global R work queue, and all I/O pollers of cores currently included in the W core set 204b (e.g., having a core I/O type=W) or more generally identified as servicing write requests can pull or obtain write requests from the single global W work queue.

In at least one embodiment as part of load balancing among the cores, the number of I/O requests pulled and thus the maximum number of I/O requests allowed in a core's corresponding core I/O request queue 308-j at a same point in time can be based, at least in part, on the current core queue depth of the core and a maximum threshold or maximum allowable core queue depth. In at least one embodiment, use of the current core queue depths and maximum allowable queue depth threshold(s) can be utilized to perform load balancing among the cores. In at least one embodiment, a first maximum allowable R queue depth can be specified for use with R cores or cores that are candidates for servicing read requests; and a second maximum allowable W queue depth can be specified for use with W cores or cores that are candidates for servicing write requests. In at least one embodiment, the maximum allowable R queue depth and the maximum allowable W queue depth can be independently determined dynamically and can be different values that vary over time and with embodiment. In at least one embodiment, the maximum allowable R queue depth can be based, at least in part, on a total number of outstanding read requests, operations or commands (e.g., I/O requests of type read), a number of R cores or cores allowed to service reads, and an average amount of time taken or expected to be taken to complete a read request. In at least one embodiment, the maximum allowable W queue depth can be based, at least in part, on a total number of outstanding write requests, operations or commands (e.g., I/O requests of type write), a number of W cores or cores allowed to service writes, and an average amount of time taken or expected to be taken to complete a write request.

In at least one embodiment, the time taken to complete request can be a measured or observed amount of elapsed time that occurs between when the request is received at the storage system to when an acknowledgement regarding completion of the request is returned by the storage system to the host or other client that issued the request.

In at least one embodiment, when assigning I/O requests of the I/O work queue to cores of the I/O request core set 204, if a particular core has already reached its allowable maximum queue depth, then processing can continue, such as in a round robin manner, traversing the cores of the core set 204 until a candidate core is determined to which the I/O request can be assigned. Consistent with discussion herein in at least one embodiment, a core can be selected for processing an I/O request based, at least in part, on the I/O request type, the current core I/O type (e.g., whether a core is in the R core set 204a or W core set 204b), the current queue depth of a core, and a maximum allowable queue depth threshold. In at least one embodiment, a core can be selected for processing an I/O request if the I/O request type matches the current core I/O type, and if the core's current queue depth has not already reached the maximum allowable queue depth threshold. In some embodiments, a core for servicing an I/O request can be selected from a candidate core set such that the selected core has a minimum core queue depth of all cores in the candidate core set, where each core in the candidate core set is allowed to service I/O request types matching that of the I/O request. For example, each core in the candidate core set can have an associated core I/O type or classification matching the I/O type of the I/O request.

In at least one embodiment, other cores such as of the background storage operation core set 202 can also similarly each have a corresponding request poller that pulls requests from a request work queue. In some embodiments, I/O requests, background storage operation requests as well as other types of requests can be included in one or more request work queues. In this case, a core's corresponding request poller can generally examine a pulled request's particular type and determine whether the core is allowed to service or run requests of the particular type. If not, the poller can select another core allowed to service or run requests of the particular type, and accordingly forward the pulled request to the selected other core.

In at least one embodiment, the total number of outstanding read requests in the system can include read requests that are in the I/O work queue 302 as well as read requests that have been assigned to cores and thus included in the core I/O request queues 308a-j. In at least one embodiment, the total number of outstanding write requests in the system can include write requests that are in the I/O work queue 302 as well as write requests that have been assigned to cores and thus included in the core I/O request queues 308a.

In at least one embodiment, the core queue depth with respect to a single one of the I/O cores of the set 204 can be a count of the number of outstanding I/O requests assigned to the single I/O core for processing or servicing. In at least one embodiment, the average queue depth of R cores can denote an average count or number of outstanding read requests assigned to R cores 204a, and the average queue depth of W cores can denote an average count or number of outstanding write requests assigned to W cores 204b.

In at least one embodiment, the J cores allocated for I/O request processing or servicing and included in the I/O request core set 204 can have associated core IDs (identifiers) where each core can be uniquely identified using its corresponding core ID. In some embodiments, the core IDs can be integers such that the J cores of set 204 denote a consecutive sequence of integers. For example as illustrated in FIG. 4, the J cores can have corresponding core IDs ranging from 1 to J, inclusively.

In at least one embodiment, an I/O request or more generally a request, assigned to a core can be queued waiting for service or execution at various points in time during processing of the I/O. Thus in at least one embodiment, an I/O core's queue can include: 1) I/Os assigned to the core that have not yet been serviced at all by the core; and 2) I/Os assigned to the core for which the core has commenced servicing but for which servicing is not yet completed, where the I/O is now in the queue waiting, for example, for completion of some task or operation and/or waiting for a resource. For example, an I/O can be assigned to a core and can initially be waiting in the core's queue for servicing whereby the core has not yet commenced servicing the I/O. The I/O can be serviced by the core for a first amount of time and then be placed back into the core's queue in response to the I/O waiting for completion of a particular task or waiting to acquire a particular resource. For example, consider a read I/O serviced by a core. The read I/O can be in progress but waiting, for example, for content or data to be read from BE storage to service the read I/O, where the read I/O can be placed back into the core's queue while waiting for the content to be read from the BE storage.

Initially in at least one embodiment, each of the cores 310a-j can have associated core I/O type or classification of mixed. The count or size S1 of the number of R cores in 204a and the count or size S2 of the number of W cores in 204b can be determined, for example, based on the percentages or workload mix of total outstanding writes and reads in the system. For example, S1 and S2 can be percentages of the total number of J cores, where S1 is based, at least in part, on a percentage of the total outstanding I/O requests that are reads in the system and where S2 is based, at least in part, on a percentage of the total outstanding I/O requests that are writes in the system. For example consistent with other discussion herein, if 80% of the total outstanding I/O requests in the system are reads and 20% of the total outstanding I/O requests in the system are writes, S1 can be 80% of J and S2 can be 20% of J as initial values for S1 and S2. However in at least one embodiment, the particular cores in each of the subsets 204a and 204b may not yet be determined. During an initial startup time period prior to assigning each of the cores 310a-j a core I/O type of either read (R) or write (W), cores can be assigned an R type starting from the lowest core ID (e.g., 1) of the J cores 310a-j, and cores can be assigned a W type starting from the highest or largest core ID (e.g. J) as read and write requests are assigned to selected ones of the cores 310a-j for processing until S1 cores are assigned a core I/O type of R and until S2 cores are assigned a core I/O type of W.

To further illustrate in at least one embodiment, assume all cores 310a-j each initially have a core I/O type of mixed. A first read request R1 can be received and assigned to core 310a, core ID=1, where core 310a can be assigned a core I/O type=R. A next second read request R2 can be received and assigned to core 310b, core ID=2, where core 310b can be assigned a core I/O type=R. Thus, as read requests are initially assigned to cores based on increasing core IDs, such cores can also be assigned a core I/O type=W until S1 R cores have been labeled with a core I/O type=R. Once S1 read requests have been assigned to S1 R cores, subsequent read requests can be assigned to a selected one of the S1 R cores based, at least in part, on the current core queue depths of the R cores 204a and the maximum allowable queue depth of an R core. In at least one embodiment, processing can simply traverse the set of R cores 204a, such as in increasing core ID order, and assign a subsequent read request S1+1 to the first R core of 204a with a current core queue depth that is not already at its maximum allowable queue depth. As a variation in at least one embodiment, processing can assign a subsequent read request S1+1 to a particular one of the cores of the R set 204a with the minimum or smallest current core queue depth that is also less than the maximum allowable queue depth. Yet additional subsequent read requests S1+2, S1+3, and so on, can be assigned to one of the R cores 204a in a manner similar to that at just described for read request S1+1.

Write requests in at least one embodiment can be processed in a manner similar to read requests with differences noted in the following discussion. To further illustrate, a first write request W1 can be received and assigned to core 310j, core ID=J, where core 310j can be assigned a core I/O type=W. A next second write request W2 can be received and assigned to core 310j-1, core ID=J−1, where core 310j-1 can be assigned a core I/O type=W. Thus, as write requests are initially assigned to cores based on decreasing core IDs, such cores can also be assigned a core I/O type=W until S2 W cores have been labeled with a core I/O type=W. Once S2 write requests have been assigned to S2 W cores, subsequent write requests can be assigned to a selected one of the S2 W cores based, at least in part, on the current core queue depths of the W cores 204b and the maximum allowable queue depth of a W core. In at least one embodiment, processing can simply traverse the set of W cores 204b, such as in decreasing core ID order, and assign a subsequent write request S2+1 to the first W core of 204b with a current core queue depth that is not already at its maximum allowable queue depth. As a variation in at least one embodiment, processing can assign a subsequent write request S2+1 to a particular one of the cores of the W set 204b with the minimum or smallest current core queue depth that is also less than the maximum allowable queue depth. Yet additional subsequent write requests S2+2, S2+3, and so on, can be assigned to one of the W cores 204b in a manner similar to that as just described for write request S2+1.

As a variation to the foregoing in at least one embodiment, a number of the J cores of the I/O request core set 204, or more generally a number of the M cores in the system (where M can denote a total number of cores of both sets 202 and 204) can be reserved and can remain assigned a core type of mixed. As can be dynamically and periodically determined based on current read request workload and current write request workload, one or more of the reserved mixed cores can be suitably assigned a core I/O type of R or W. In some embodiments, a core having a core I/O type of mixed can be allowed to run both read requests and write requests. In at least one embodiment, one or more of the reserved mixed cores can be assigned a core I/O type of R based on one or more of the following: if the read request workload exceeds a specified workload threshold, and/or if the average core queue depth of R cores 204a exceeds a specified threshold. The number of mixed cores assigned the core I/O type of R can be determined, based at least in part, on the amount by which one or more of the foregoing thresholds characterizing read workload are exceeded. In a similar manner in at least one embodiment, one or more of the reserved mixed cores can be assigned a core I/O type of W based on one or more of the following: if the write request workload exceeds a specified workload threshold, and/or if the average core queue depth of W cores 204b exceeds a specified threshold. The number of mixed cores assigned the core I/O type of W can be determined, based at least in part, on the amount by which one or more of the foregoing thresholds characterizing write workload are exceeded. In at least one embodiment, a core I/O type of mixed may also be allowed to run or service additional request types, such as background storage operation requests as well as other I/O types, as discussed elsewhere herein as may be defined and vary with embodiment.

In at least one embodiment with core types of read R, write W, and mixed, a mixed core type can be allowed to run or service both read and write requests. In some embodiments, a read request can be serviced by a core with an associated mixed classification only of all other R cores have core queue depths that exceed a specified maximum allowable threshold (e.g., maximum allowable queue depth threshold for an R core); and a write request can be serviced by a core with an associated mixed classification only of all other W cores have core queue depths that exceed a specified maximum allowable threshold (e.g., maximum allowable queue depth threshold for a W core).

In at least one embodiment during the initial period of time, information can be collected to provide further meaningful initial values for various metrics some of which discussed herein such as, for example, an average R core queue depth, an average W core queue depth, average time to complete a read request (e.g., I/O request of type read), and average time to complete a write request (e.g., I/O request of type write). In some embodiments during the initial time period and more generally prior to collecting sufficient data for computing meaningful values for average R core queue depth and average W core queue depth, an embodiment can periodically partition or repartition the I/O request cores 204 into subsets 204a-b based, at least in part, on the total number of outstanding read requests and the total number of outstanding write requests. In some embodiments, once an initial amount of time has elapsed or at least a specified number or percentage of the J mixed cores of the I/O request core set 204 have been classified as either an R core or a W core to thereby provide for sufficient data gathering to determine average W core and R core queue depths, such average R core and W core queue depths can be used to, at least in part, further classify remaining mixed cores as W or R and also can be used to repartition the I/O request cores 204 into subsets 204a-b.

Consistent with discussion herein, a core allocation policy can be defined and used to partition I/O request core set 204 into subsets 204a-b. In at least one embodiment, the core allocation policy can use the total number of outstanding reads and the total number of outstanding writes during an initial startup time until sufficient data is gathered to determine meaningful values for the average queue depth of R cores and the average queue depth of W cores. For example, during the initial startup time, the total number of outstanding reads and the total number of outstanding writes can be used to determine read and write workload request percentages until at least a threshold number or percentage of mixed cores of 204 have been classified as R or W cores. In such an embodiment, the cores of the set 204 can be classified as R or W in incremental portions over multiple time periods during the initial startup time based. For example, if there are J=100 cores in the set 204 that are mixed, an embodiment can classify 20% or 20 of the cores as R or W over the course of 5 time periods based on the total number of outstanding reads and the total number of outstanding writes at each time period.

To illustrate processing in accordance with the core allocation policy in at least one embodiment during the initial startup prior to reaching a steady state, consider the following example where all J cores of the set 204 are initially all mixed and need to be partitioned into the R core subset 204a and W core subset 204b. During the initial startup prior to reaching a steady state, the core allocation policy can be run a number of times. During each such time, a specified percentage or number of mixed cores of 204 can be partitioned or labeled as R or W based, at least in part, on the % of outstanding reads and % of outstanding writes in the system. The % or number of mixed cores additionally configured or labeled as R or W each time period can be configurable and can vary with embodiment. For example, the % or number of mixed cores additionally classified as R or W each time period can be 20% of the total number of cores. For example, if 100 I/O cores, each time period that the core allocation policy runs during the initial start up 20 additional mixed cores can be classified as either R or W based, at least in part, on the % of outstanding read requests and % of outstanding write requests in the system. The foregoing incrementally classifying 20 mixed cores as R or W can be done until sufficient data regarding the average queue depth of R cores and average queue depth of W cores has been obtained.

The point in time deemed sufficient can be configurable and can vary with embodiment. For example, in at least one embodiment, the foregoing can be performed until all I/O cores, or more generally a threshold number of cores or threshold percentage of all cores, have been labeled or classified as R or W. In at least one embodiment, the foregoing can be performed until a specified number or percentage of the total cores have been classified such as 50%, 80%, or some other suitable percentage of the cores, or after a certain amount of time has passed. In this latter case for example, after 50% of the mixed cores have been classified as R or W, the average queue depth of R cores and average queue depth of W cores can be used to determine any further partitioning of I/O request cores into a set of R cores and a set of W cores. The number of mixed cores further classified or partitioned can be incremented or increased each time period such as by adding 10% or some other specified percentage or number of remaining mixed cores until all 100% of the desired mixed cores are classified as either R or W. For example to further illustrate, assume that 20% of the total number of cores in the set 204 are classified as R or W each time period until 100% or all such cores are classified as R or W. Assume the total number (100%) of cores to be classified is 100 and that 20 mixed cores are classified each time period as R or W. At the start of time period (TP) 1, 100% or 100 of the cores are mixed. During TP1, 20 of the mixed cores are classified as R or W based on the relative percentages of the total number of outstanding read requests and write requests in the system. At the start of the next TP2, there are 80 mixed cores yet to classified and 20 cores classified as R or W. During TP2, an additional 20 mixed cores are classified as R or W based on the relative percentages of the total number of outstanding read requests and write requests in the system. At the end of TP2 and at the start of the next TP3, there are 60 mixes cores yet to be classified and 40 cores classified as R or W. During TP3, an additional 20 mixed cores are classified as R or W based on the relative percentages of the total number of outstanding read requests and write requests in the system. At the end of TP3, 60 cores have been classified as R or W and 40 cores (40%) remain as mixed and not yet classified as R or W. In at least one embodiment, 50% can be selected as the threshold level of cores that need to be classified as R or W (no longer mixed) in order to commence use of the average queue depth metrics rather than the totals regarding read and write requests in the system. In at least one embodiment since more than 50% of the mixed cores are now classified as R cores and W cores, processing can continue in the next TP4 with classifying an additional 20%=20 of remaining mixed cores as R or W based, at least in part, on the average queue depth of R cores (sometimes referred to as average R core queue depth) and the average queue depth of W cores (sometimes referred to as average W core queue depth). In a similar manner, the next TP5 can classify the last remaining 20 mixed cores as R or W based, at least in part, on the average queue depth of R cores (sometimes referred to as average R core queue depth) and the average queue depth of W cores (sometimes referred to as average W core queue depth).

Following the initial partitioning or classification of the cores of the set 204 into subsets 204a-b, a system in at least one embodiment can be characterized as reaching a steady state. When in steady state, the set of cores 204 can be periodically repartitioned into subsets 204a-b based, at least in part, on the average queue depth of R cores (sometimes referred to as average R core queue depth) and the average queue depth of W cores (sometimes referred to as average W core queue depth).

Figure 5:
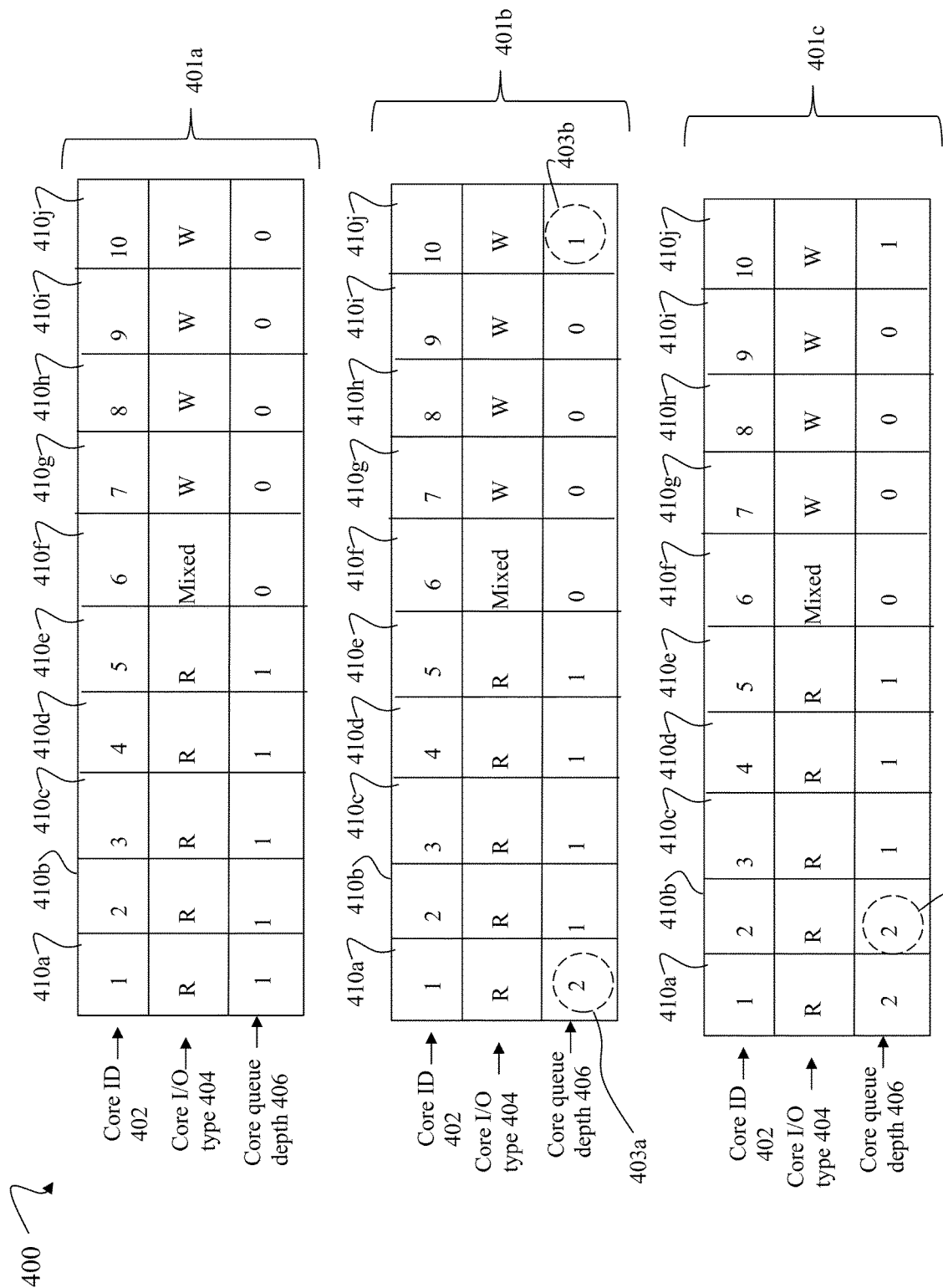
FIG. 5 is an example illustrating the state of I/O request cores and associated information at various points in time in at least one embodiment in accordance with the techniques of the present disclosure.

In at least one embodiment during the initial period or startup, all cores of the set 204 can initially be mixed as noted elsewhere herein. When selecting a mixed core for assignment and servicing a read or write request, requests can be distributed and assigned to the multiple mixed cores in a round robin manner. For example assume the set 204 includes J=10 cores as illustrated in FIGS. 4 and 5 with core IDs from 1-10 and all 10 cores are mixed. In at least one embodiment, read requests can be assigned to cores starting with the lowest numbered core ID of 1 in this example, where subsequent read requests can be consecutively assigned to sequentially increasing core IDs 2, 3, 4, and so on. In at least one embodiment, write requests can be assigned to cores starting with the highest numbered core ID of 10 in this example, where subsequent write requests can be consecutively assigned to sequentially decreasing core IDs 9, 8, 7, and so on. Over time, the core allocation policy can run and classify mixed cores as R cores and W cores as discussed elsewhere herein. As noted elsewhere herein in at least one embodiment with read R, write W and mixed cores, for an I/O request of a particular I/O type of R or W, processing can first determine whether the I/O request can be assigned to a candidate core with a type matching the request's I/O type and where the core also has a current queue depth less than a specified threshold. If so, the I/O request is assigned to that core. If not, processing can then determine whether the I/O request can be assigned to a mixed core with a current queue depth less than a specified threshold. If so, the I/O request can be assigned to that mixed core.

In at least one embodiment, the following queue depth metrics and equations can be used to partition or repartition a number of cores as R or W.

In at least one embodiment when partitioning a set of Z cores into a first percentage F1% of R cores and a second percentage F2 of W cores, specified number of cores Z, F1 can be determined as in EQUATION 1 below:

$$F1 = \frac{\text{average queue depth of } R \text{ cores}}{\text{average queue depth of } R \text{ cores} + \text{average queue depth of } W \text{ cores}} \quad \text{EQUATION 1}$$

and F2 can be determined as in EQUATION 2 below:

$$F2 = \frac{\text{average queue depth of } W \text{ cores}}{\text{average queue depth of } R \text{ cores} + \text{average queue depth of } W \text{ cores}} \quad \text{EQUATION 2}$$

In at least one embodiment, EQUATIONS 1 and 2 can be used in connection with the core allocation policy in incrementally partitioning or labeling a portion of the initially mixed cores during the initial startup once the specified threshold percentage or number of cores are classified as R or W.

In at least one embodiment, EQUATIONS 1 and 2 can be used in connection with the core allocation policy during steady state after cores of the set 204 have all been initially classified as R or W to periodically repartition the cores of the set 204 into sets 204a and 204b. For example, the core subset 204a can include 40% of the cores of 204 and the core subset 204b can include 60% of the cores. When the core allocation policy is run based on the current average queue depth of R cores and the current average queue depth of W cores, F1 can be 50% and F2 can be 50% such that the cores of 204 can be repartitioned such that subset 204a includes 50% of the cores of 204 and subset 204b includes 50% of the cores of 204 in accordance with EQUATIONS 1 and 2.

In at least one embodiment once in steady state, the core allocation policy can generally ensure that no more than a specified MAX (maximum) number or MAX % of cores in 204 are relabeled at any time the core allocation policy is run. In at least one embodiment, the MAX number or MAX % can be dynamically determined based, at least in part, on any one or more of: a percentage of the total outstanding I/O requests that are reads, a percentage of the total outstanding I/O requests that are writes, a ratio of the total outstanding read requests in the system with respect to the total outstanding write requests in the system, an amount or measurement of change in read request workload between the current point in time when the current core allocation policy is executing and a prior point in time of the most recent prior core allocation policy execution (e.g., the last or most recent prior partitioning of the I/O request cores 204 into subset 204a-b), and an amount or measurement of change in write request workload between the current point in time when the current core allocation policy is executing and a prior point in time of the most recent prior core allocation policy execution (e.g., the last or most recent prior partitioning of the I/O request cores 204 into subset 204a-b).

Referring to FIG. 5, shown is an example 400 illustrating use of the techniques of the present disclosure in at least one embodiment.

The example 400 illustrates the state of J cores at 3 consecutive points in time: a first point in time T1 having associated information 401a, a second point in time T2 after T1 having associated information 401b, and a third point in time T3 after T2 having associated information 401c. Each of the illustrated states and associated sets of information 401a-c includes core IDs 402, core I/O types 404 and core queue depths 406 for each of the J cores 410a-j. In this example, cores 1-5 410a-e are included in the R core set 204a, cores 7-10 410g-j are included in the W core set 204b and where core 6 is designated as a mixed core I/O type that can service reads and writes.

At time T1 as denoted by 401a, cores 1-5 410a-e each are servicing or running a single read request. None of the remaining cores 410f-j are servicing or running any requests.

At time T2 as denoted by 401b, the I/O poller of core 410a can pull an I/O request R1 from the I/O work queue that is read request R1. The I/O poller of core 410a determines that: 1) R1's request type of read matches core 410a's core I/O type 404 of R; and 2) core 1 410a's current queue depth is 1 and is less than a specified maximum allowable R core queue depth THRESH1, whereby R1 is assigned to core 1 410a for processing. Also at time T2, the I/O poller of core 410a can pull another I/O request W1 from the I/O work queue that is a write request W1. The I/O poller of core 410a determines that: 1) W1's request type of write does not match core 410a's core I/O type 404 of R so the I/O poller of core 410a forwards the W1 to a selected one of the W cores, W core 410j. Consistent with other discussion herein in at least one embodiment, the W cores can be traversed in a round robin manner from highest core ID to lowest core ID to locate a candidate W core that can service or run W1. As a result, the I/O poller of core 410a forwards W1 to core 410j, the W core having the highest core ID. The I/O poller of W core 410j determines that: 1) W1's request type of write matches core 410j's core I/O type 404 of W; and 2) core 10 410j's current queue depth is 1 and is less than a specified maximum allowable W core queue depth THRESH2, whereby W1 is assigned to core 10 410j for processing. It should be noted that if core 410j had a current core queue depth equal to THRESH2 so that W1 could not be assigned to core 410j, processing can continue to traverse the W cores, in consecutive sequential order, from 410i (core 9), 410h, (core 8), and 410g (core 7) to locate an available W core that does not have a corresponding core queue depth of THRESH2. In the event that processing determines all W cores 410g-j are currently assigned the maximum allowable number of requests of THRESH2, in at least one embodiment W1 can then be assigned to a mixed core, if any, such as mixed core 410f. In at least one embodiment, the selected mix core 410f can be assigned W1 if its core queue depth is less than a specified maximum threshold such as one for mixed cores. In at least one embodiment where there are multiple mixed cores, processing can select one of the multiple mixed cores to which W1 is assigned, where the selected mixed core can have the minimum core queue depth of all multiple mixed cores. In at least one embodiment, if processing cannot locate a candidate W core or mixed core for W1 assignment, then W1 can be returned to the I/O work queue 302 as the next I/O request to be selected for core assignment and servicing.

Thus 401b describes the state of the cores at the time T2 after R1 is assigned to R core 410a for processing and also after W1 is assigned to core 410j for processing. As denoted by 403a of 401b, the current core queue depth 406 of core 410a is incremented to 2 (as a result of assignment of R1); and the current core queue depth 406 of core 410j is incremented to 1 (as a result of assignment of W1).

At time T3, the I/O poller of core 410a can pull another I/O request R2 from the I/O work queue that is a read request R2. The I/O poller of core 410a determines that: 1) R2's request type of read matches core 410a's core I/O type 404 of R; and 2) core 1 410a's current queue depth is 2 and is equal to the specified maximum allowable R core queue depth THRESH1. As a result, R2 can be forwarded to core 1 410b. The I/O poller of core 410b The determines that: 1) R2's request type of read matches core 410b's core I/O type 404 of R; and 2) core 2 410b's current queue depth is 1 and is less than a specified maximum allowable R core queue depth THRESH1, whereby R2 is assigned to core 2 410b for processing.

Thus 401c describes the state of the cores at the time T3 after R2 is assigned to R core 410b for processing. As denoted by 403c of 401c, the current core queue depth 406 of core 410b is incremented to 2 (as a result of assignment of R2). It should be noted that if core 410b had a current core queue depth equal to THRESH1 so that R2 could not be assigned to core 410b, processing can continue to traverse the R cores, in consecutive sequential order, from 410b (core 2) through core 410e (core 5) to locate an available R core that does not have a corresponding core queue depth of THRESH1. In the event that processing determines all R cores 410a-e are currently assigned the maximum allowable number of requests of THRESH1, in at least one embodiment R2 can then be assigned to a mixed core, if any, such as mixed core 410f. In at least one embodiment, the selected mix core 410f can be assigned R2 if its core queue depth is less than a specified maximum threshold such as one for mixed cores. In at least one embodiment where there are multiple mixed cores, processing can select one of the multiple mixed cores to which R2 is assigned, where the selected mixed core can have the minimum core queue depth of all multiple mixed cores. In at least one embodiment, if processing cannot locate a candidate R core or mixed core for R2 assignment, then R2 can be returned to the I/O work queue 302 as the next I/O request to be selected for core assignment and servicing.

It should be noted that the foregoing describes traversing R cores and W cores in a round robin manner with a particular ordering based on respectively increasing and decreasing core IDs. More generally an embodiment can traverse R cores and W cores in any suitable order and is not limited to the particular examples provided in this disclosure for illustrative purposes.

The techniques of the present are described for purposes of illustration with two defined I/O types of read R and write W, where I/O requests of a particular I/O type of R can be segregated to only run on a set of R cores and I/O requests of a particular type of W can be segregated to only run on a set of W cores (e.g., no read request runs on a W core). More generally, the techniques of the present disclosure can be used in connection with any defined set of multiple I/O request types. In this case, more generally, I/O requests of a particular one of the types can run only in a specified set or portion of cores. Put another way in at least one embodiment with K I/O request types, the set of I/O cores can be partitioned into K portions where each of the K portions can only run or service requests of a single corresponding one of the K I/O request types. For example, rather than classify certain commands or requests such as XCOPY and UNMAP as a write request I/O type, an embodiment can define one or more additional I/O types for XCOPY, UNMAP and/or additional commands or requests. To further illustrate in at least one embodiment, I/O request types can include: a read type for read I/Os, a write type for write I/Os, a third type for XCOPY commands and a fourth type for UNMAP commands such that received I/O requests of the foregoing 4 types can run or be serviced by 4 separate core sets (e.g., such that no core is assigned more than a single type of I/O requests to run or service). Generally, the techniques of the present disclosure can be applied to include in a single I/O type or classification commands, requests and operations having at least a portion of the same code or code paths in common. Ideally in at least some embodiments, it can be desirable to separate I/O requests to keep I/O requests having the same I/O type with identical code paths running on the same subset of cores.

Figure 6:
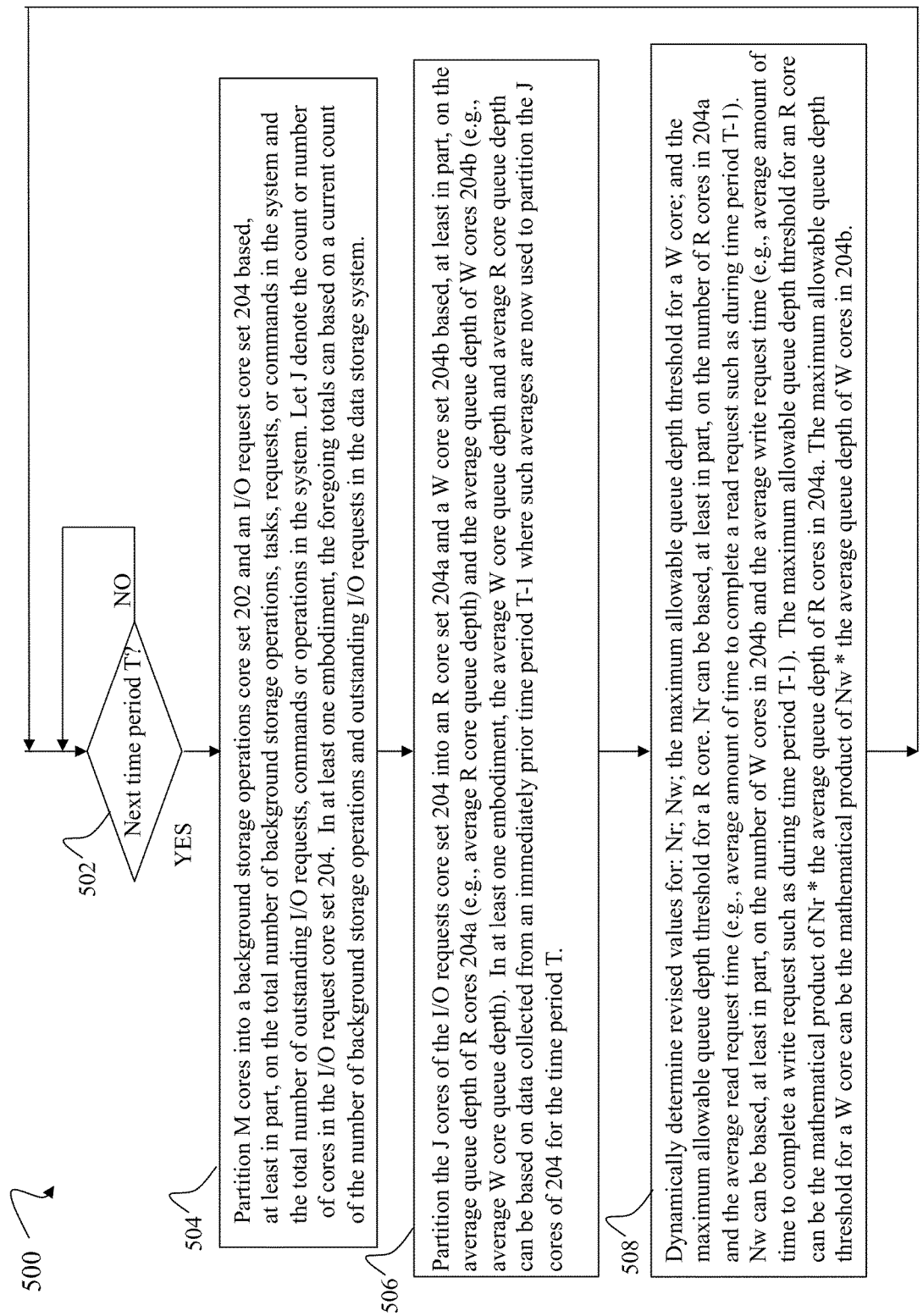
FIGS. 6, 7 and 8 are flowcharts of processing steps that can be performed in at least one embodiment in accordance with the techniques of the present disclosure.
Figure 7:
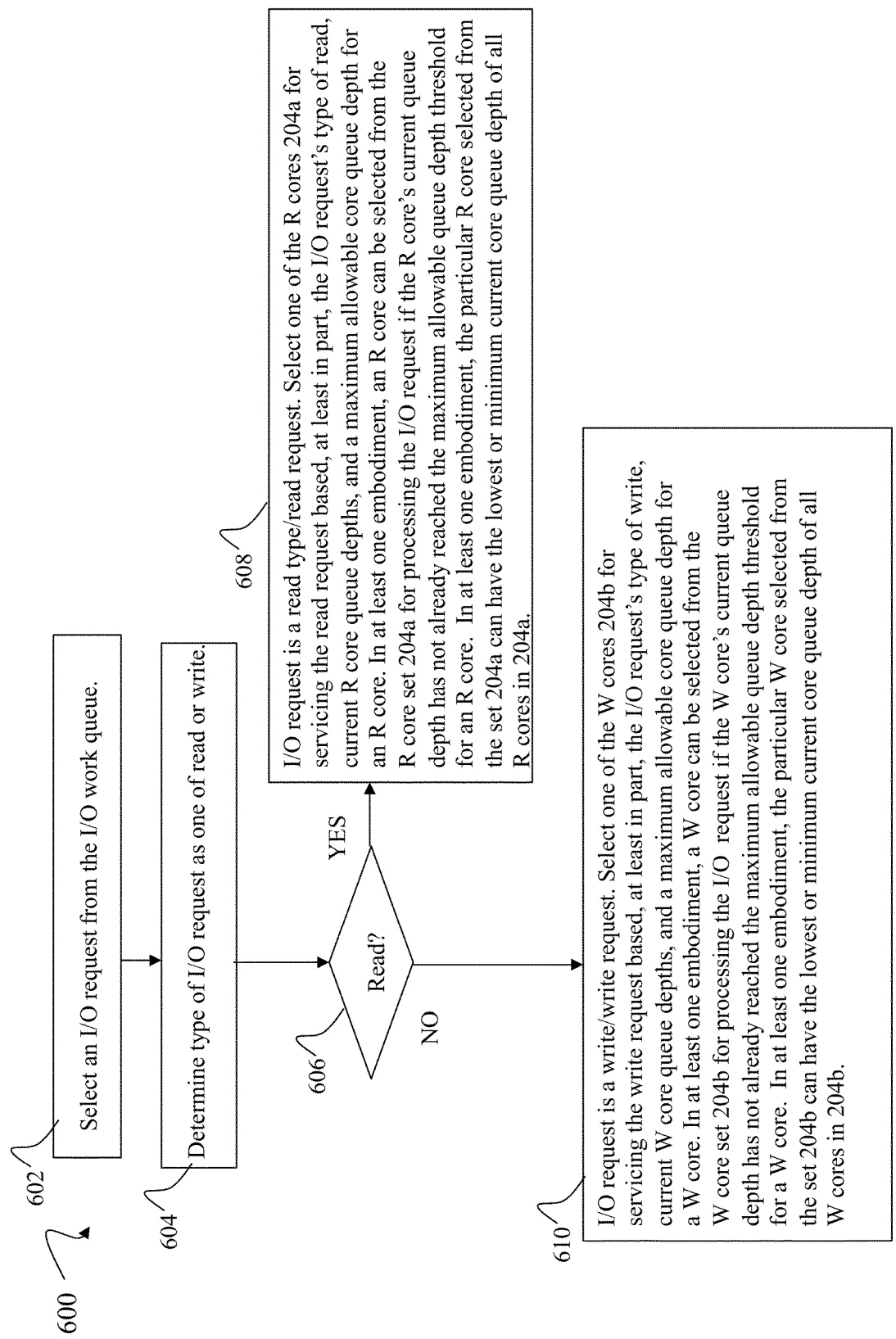
Figure 8:
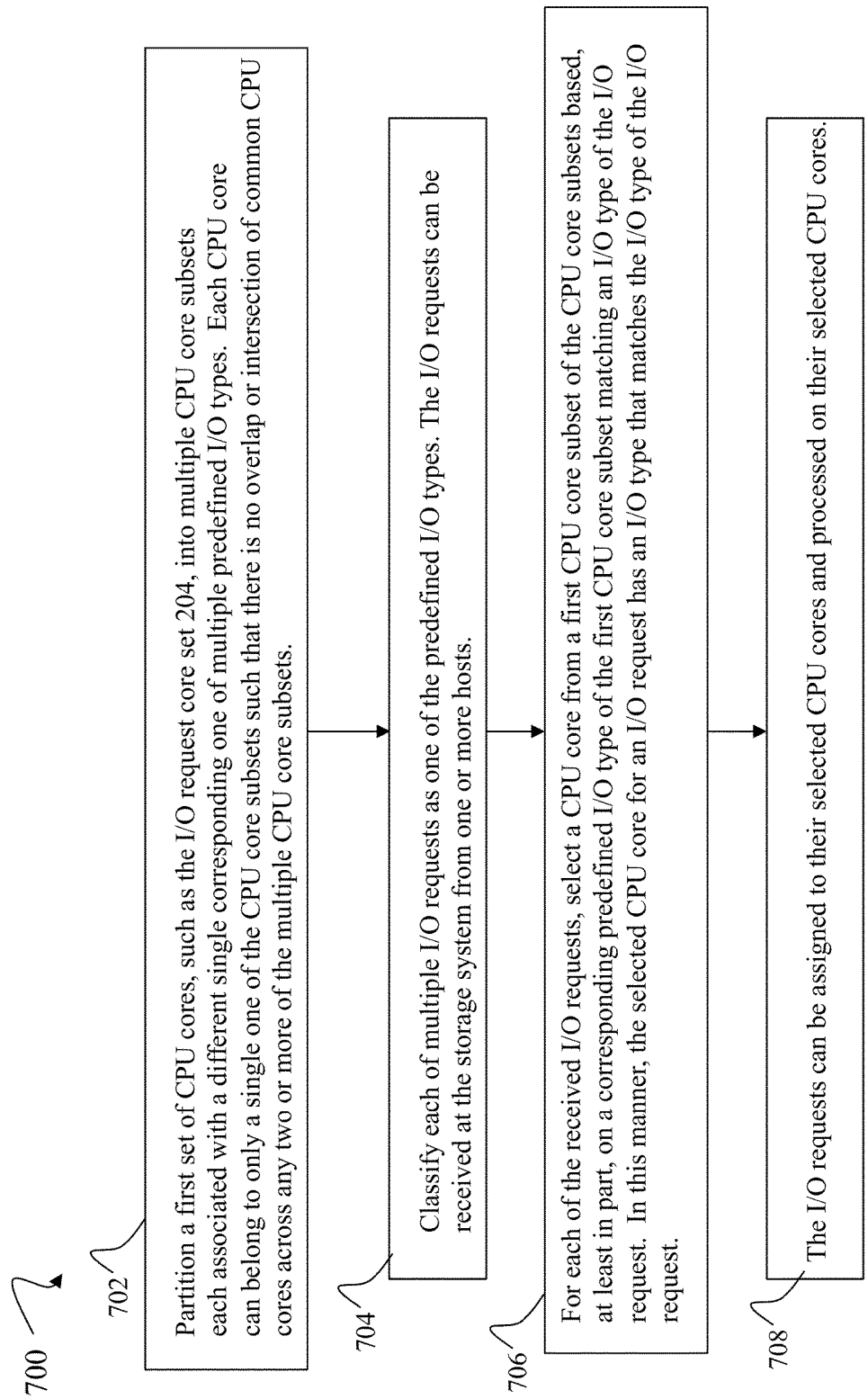

What will now be described in FIGS. 6, 7, and 8 are flowcharts summarizing processing described above that can be performed in at least one embodiment in accordance with the techniques of the present disclosure.

Referring to FIG. 6, shown is a flowchart 500 of processing that can be performed in at least one embodiment in accordance with the techniques herein to partition or repartition cores. The flowchart 500 can be performed, for example, when the system is a steady state as discussed elsewhere herein. It should be noted that although this example 500 includes forming sets 202 and 204 (step 504), forming subsets 204a-b (step 506), and also determining various metrics or values (step 508) in the same time period occurrence, more generally, each of the steps 504, 506 and 508 can be performed at different independent time period occurrences.

At the step 502, a determination can be made as to whether it is time to repartition the sets of cores. If the step 502 evaluates to no, control remains at 502. Once the step 502 evaluates to yes, control proceeds to step 504.

At the step 504, processing can be performed to partition the M cores of the system into a background storage operations core set 202 and an I/O request core set 204 based, at least in part, on the total number of background storage operations, tasks, requests, or commands in the system and the total number of outstanding I/O requests, commands or operations in the system. Let J denote the count or number of cores in the I/O request core set 204. In at least one embodiment, the foregoing totals can based on a current count of the number of background storage operations and outstanding I/O requests in the data storage system. From the step 504, control proceeds to the step 506.

At the step 506, processing can be performed to partition the J cores of the I/O requests core set 204 into an R core set 204a and a W core set 204b based, at least in part, on the average queue depth of R cores 204a (e.g., average R core queue depth) and the average queue depth of W cores 204b (e.g., average W core queue depth). In at least one embodiment, the average W core queue depth and average R core queue depth can be based on data collected from an immediately prior time period T−1 where such averages are now used to partition the J cores of 204 for the time period T. From the step 506, control proceeds to the step 508.

At the step 508, processing can dynamically determine revised values for: Nr; Nw; the maximum allowable queue depth threshold for a W core; and the maximum allowable queue depth threshold for a R core. Nr can be based, at least in part, on the number of R cores in 204a and the average read request time (e.g., average amount of time to complete a read request such as during time period T−1). Nw can be based, at least in part, on the number of W cores in 204b and the average write request time (e.g., average amount of time to complete a write request such as during time period T−1). The maximum allowable queue depth threshold for an R core can be the mathematical product of Nr* the average queue depth of R cores in 204a. The maximum allowable queue depth threshold for a W core can be the mathematical product of Nw* the average queue depth of W cores in 204b. From the step 508, control proceeds to the step 502.

Referring to FIG. 7, shown is a flowchart 600 of processing steps that can be performed to process, service or run an I/O request in at least one embodiment in accordance with the techniques of the present disclosure. Generally, the steps of 600 can be performed for each received I/O request included in the I/O work queue.

At the step 602, an I/O request can be selected from the I/O work queue of requests received by the storage system but not yet assigned to cores for servicing. From the step 602, control proceeds to the step 604.

At the step 604, the type of the I/O request selected can be determined as one of read or write. From the step 604, control proceeds to the step 606.

At the step 606, a determination is made as to whether the I/O request type of the selected request is read. If the step 606, evaluates to yes, control proceeds to the step 608.

At the step 608, it is known that the selected I/O request is a read type or read request. At the step 608, processing can be performed to select one of the R cores 204a for servicing the read request based, at least in part, the I/O request's type of read, current R core queue depths, and a maximum allowable core queue depth for an R core. In at least one embodiment, an R core can be selected from the R core set 204a for processing the I/O request (e.g., selected read request) if the R core's current queue depth has not already reached the maximum allowable queue depth threshold for an R core. In at least one embodiment, the particular R core selected from the set 204a can have the lowest or minimum current core queue depth of all R cores in 204a.

If the step 606 evaluates to no, control proceeds to the step 610.

At the step 610, it is known that the selected I/O request is a write type or write request. At the step 610, processing can be performed to select one of the W cores 204b for servicing the write request based, at least in part, the I/O request's type of write, current W core queue depths, and a maximum allowable core queue depth for a W core. In at least one embodiment, a W core can be selected from the W core set 204b for processing the I/O request if the W core's current queue depth has not already reached the maximum allowable queue depth threshold for a W core. In at least one embodiment, the particular W core selected from the set 204b can have the lowest or minimum current core queue depth of all W cores in 204b.

Referring to FIG. 8, shown is a flowchart 700 of processing steps that can be performed in at least one embodiment in accordance with the techniques of the present disclosure. The flowchart 700 is a generalization of processing that can be performed to partition the I/O request core set 204 and assign and process I/O requests each classified as one of multiple defined I/O types.

At the step 702, processing can partition a first set of CPU cores, such as the I/O request core set 204, into multiple CPU core subsets each associated with a different single corresponding one of multiple predefined I/O types. Each CPU core can belong to only a single one of the CPU core subsets such that there is no overlap or intersection of common CPU cores across any two or more of the multiple CPU core subsets. From the step 702, control proceeds to the step 704.

At the step 704, processing can classify each of multiple I/O requests as one of the predefined I/O types. The I/O requests can be received at the storage system from one or more hosts. From the step 704, control proceeds to the step 706.

At the step 706, for each of the received I/O requests, processing can select a CPU core from a first CPU core subset of the CPU core subsets based, at least in part, on a corresponding predefined I/O type of the first CPU core subset matching an I/O type of the I/O request. In this manner, the selected CPU core for an I/O request has an I/O type that matches the I/O type of the I/O request. From the step 706, control proceeds to the step 708.

At the step 708, the I/O requests can be assigned to their selected CPU cores and processed on their selected CPU cores.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
   partitioning a first set of CPU cores into a plurality of CPU core subsets each associated with a single corresponding one of a plurality of predefined I/O types, said partitioning based at least in part on queue depths of queues within the first set CPU cores;
   classifying each of a plurality of I/O requests as one of the plurality of predefined I/O types;
   for each of the plurality of I/O requests, selecting a CPU core from a first CPU core subset of the plurality of CPU core subsets based, at least in part, on the first CPU core subset having a corresponding one of the plurality of predefined I/O types that matches an associated one of the plurality of predefined I/O types of said each I/O request; and
   processing the plurality of I/O requests on their selected CPU cores.

2. The computer-implemented method of claim 1, wherein each core of the first set is included in a single one of the plurality of CPU core subsets.

3. The computer-implemented method of claim 1, wherein the plurality of I/O requests are received at a data storage system from one or more hosts.

4. The computer-implemented method of claim 1, wherein the plurality of predefined I/O types includes a read request type and a write request type.

5. The computer-implemented method of claim 1, wherein said classifying each of the plurality of I/O requests includes classifying read I/O operations of the plurality of I/O requests as the read request type and includes classifying write I/O operations of the plurality of I/O requests as the write request type.

6. The computer-implemented method of claim 1, wherein said classifying each of the plurality of I/O requests includes classifying storage reclamation commands of the plurality of I/O requests as the write request type.

7. The computer-implemented method of claim 6, wherein said storage reclamation commands classified as the write request type include any of an unmap command and a deallocate command.

8. The computer-implemented method of claim 1, wherein said classifying each of the plurality of I/O requests includes classifying offload copy operations and offload write operations of the plurality of I/O requests as the write request type.

9. The computer-implemented method of claim 1, wherein the first set of CPU cores are included in a storage system, and wherein said plurality of CPU core subsets includes a read CPU core subset that only services I/O requests classified as a read request type and includes a write CPU core subset that only services I/O requests classified as a write request type.

10. The computer-implemented method of claim 9, wherein the read CPU core subset has M1 cores and the write CPU core subset has M2 cores, wherein said partitioning the first set of CPU cores includes:
    partitioning the first set of CPU cores into the read CPU core subset and the write CPU core subset based, at least in part, on a total number of outstanding I/O requests of the read request type in the storage system and a total number of outstanding I/O requests of the write request type in the storage system.

11. The computer-implemented method of claim 10, wherein M1 corresponds to a percentage of the total number of outstanding I/O requests of the read type in the storage system, and wherein M2 corresponds to a percentage of the total number of outstanding I/O requests of the write type in the storage system.

12. The computer-implemented method of claim 9, wherein the read CPU core subset has M1 cores and the write CPU core subset has M2 cores, wherein said partitioning the first set of CPU cores includes:
    partitioning the first set of CPU cores into the read CPU core subset and the write CPU core subset based, at least in part, on an average queue depth of cores included in the read CPU core subset and an average queue depth of cores included in the write CPU core subset.

13. The computer-implemented method of claim 12, wherein a first sum is determined by adding the average queue depth of cores included in the read CPU core subset to the average queue depth of cores included in the write CPU core subset, wherein M1 corresponds to a percentage or ratio of the average queue depth of cores included in the read CPU core subset with respect to the first sum, and wherein M2 corresponds to a percentage or ratio of the average queue depth of cores included in the write CPU core subset with respect to the first sum.

14. The computer-implemented method of claim 9, further comprising:
    determining that a first I/O request of the plurality of I/O requests is a read request type; and
    selecting one core from the read CPU core subset for the first I/O request of the read request type, wherein said one core has a current core queue depth that is less than a specified threshold.

15. The computer-implemented method of claim 14, wherein the specified threshold is a maximum allowable queue depth for a core of the read CPU core subset based, at least in part, on Nr and an average queue depth of cores in the read CPU core subset, and wherein Nr is based, as least in part, on a number of cores in the read CPU core subset and an average amount of time to complete an I/O request of the read request type.

16. The computer-implemented method of claim 9, further comprising:
   determining that a first I/O request of the plurality of I/O requests is a write request type; and
   selecting one core from the write CPU core subset for the first I/O request of the write request type, wherein said one core has a current core queue depth that is less than a specified threshold.

17. The computer-implemented method of claim 16, wherein the specified threshold is a maximum allowable queue depth for a core of the write CPU core subset based, at least in part, on Nw and an average queue depth of cores in the write CPU core subset, and wherein Nw is based, as least in part, on a number of cores in the write CPU core subset and an average amount of time to complete an I/O request of the write request type.

18. A system comprising:
   one or more processors; and
   a memory comprising code stored thereon that, when executed, performs a method comprising:
      partitioning a first set of CPU cores into a plurality of CPU core subsets each associated with a single corresponding one of a plurality of predefined I/O types, said partitioning based at least in part on queue depths of queues within the first set CPU cores;
      classifying each of a plurality of I/O requests as one of the plurality of predefined I/O types;
      for each of the plurality of I/O requests, selecting a CPU core from a first CPU core subset of the plurality of CPU core subsets based, at least in part, on the first CPU core subset having a corresponding one of the plurality of predefined I/O types that matches an associated one of the plurality of predefined I/O types of said each I/O request; and
      processing the plurality of I/O requests on their selected CPU cores.

19. A non-transitory computer-readable memory comprising code stored thereon that, when executed, performs a method comprising:
   partitioning a first set of CPU cores into a plurality of CPU core subsets each associated with a single corresponding one of a plurality of predefined I/O types, said partitioning based at least in part on queue depths of queues within the first set CPU cores;
   classifying each of a plurality of I/O requests as one of the plurality of predefined I/O types;
   for each of the plurality of I/O requests, selecting a CPU core from a first CPU core subset of the plurality of CPU core subsets based, at least in part, on the first CPU core subset having a corresponding one of the plurality of predefined I/O types that matches an associated one of the plurality of predefined I/O types of said each I/O request; and
   processing the plurality of I/O requests on their selected CPU cores.

* * * * *